US012563611B2

(12) United States Patent
Tenkod

(10) Patent No.: US 12,563,611 B2
(45) Date of Patent: Feb. 24, 2026

(54) INITIATING SOFTAP MODE PROVISIONING OF WIFI DEVICE VIA CUSTOM DATA FIELD

(71) Applicant: Microchip Technology Incorporated, Chandler, AZ (US)

(72) Inventor: Hemanth Tenkod, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 583 days.

(21) Appl. No.: 18/166,824

(22) Filed: Feb. 9, 2023

(65) Prior Publication Data

US 2023/0254203 A1 Aug. 10, 2023

Related U.S. Application Data

(60) Provisional application No. 63/267,800, filed on Feb. 10, 2022.

(51) Int. Cl.
H04W 76/10 (2018.01)
H04L 9/40 (2022.01)
(Continued)

(52) U.S. Cl.
CPC ......... H04W 76/10 (2018.02); H04L 12/2807 (2013.01); H04L 41/0806 (2013.01);
(Continued)

(58) Field of Classification Search
CPC ... H04L 12/2807; H04L 41/0803–0816; H04L 41/12; H04L 63/08; H04L 63/083;
(Continued)

(56) References Cited

U.S. PATENT DOCUMENTS

| | | | | |
|---|---|---|---|---|
| 9,185,641 B2 * | 11/2015 | Ilsar | ...................... | H04W 48/08 |
| 9,185,648 B2 * | 11/2015 | Miryala | ............ | H04W 52/0216 |

(Continued)

OTHER PUBLICATIONS

International Search Report for International Application No. PCT/US2023/062290, mailed May 8, 2023, 5 pages.
(Continued)

*Primary Examiner* — Brendan Y Higa
(74) *Attorney, Agent, or Firm* — TraskBritt

(57) ABSTRACT

One or more examples relate to a method, which includes sending, from a provisioner WiFi device to a provisionee WiFi device in an idle mode, a probe request frame including a random data in a custom data field; powering up the provisionee WiFi device in a SoftAp mode at least partially responsive to receiving the probe request frame; sending, from the provisioner WiFi device to the provisionee WiFi device in the SoftAp mode, a further probe request frame including the random data in a custom data field; sending, from the provisionee WiFi device in the SoftAp mode to the provisioner WiFi device, a probe response frame; establishing a secure WiFi connection between the provisioner WiFi device and the provisionee WiFi device utilizing passphrases respectively generated by the provisioner WiFi device and the provisionee WiFi device; and sending provisioning data, from the provisioner WiFi device to the provisionee WiFi device in SoftAp mode, via the secure WiFi connection.

21 Claims, 17 Drawing Sheets

(51) Int. Cl.

| | |
|---|---|
| *H04L 12/28* | (2006.01) |
| *H04L 41/0806* | (2022.01) |
| *H04L 41/0813* | (2022.01) |
| *H04W 8/00* | (2009.01) |
| *H04W 12/06* | (2021.01) |
| *H04W 12/50* | (2021.01) |
| *H04W 12/73* | (2021.01) |
| *H04W 84/12* | (2009.01) |

(52) U.S. Cl.
CPC ........ *H04L 41/0813* (2013.01); *H04L 63/083* (2013.01); *H04L 63/0869* (2013.01); *H04W 8/005* (2013.01); *H04W 12/06* (2013.01); *H04W 12/50* (2021.01); *H04W 12/73* (2021.01); *H04W 84/12* (2013.01)

(58) Field of Classification Search
CPC .... H04L 63/0869; H04L 63/18; H04W 8/005; H04W 12/04–0471; H04W 12/06–069; H04W 12/08; H04W 12/50; H04W 12/73; H04W 40/24; H04W 76/10–11; H04W 48/00; H04W 48/08; H04W 48/16
See application file for complete search history.

(56) References Cited

U.S. PATENT DOCUMENTS

| | | | | |
|---|---|---|---|---|
| 9,578,511 | B2 * | 2/2017 | Kashef | H04W 4/50 |
| 9,628,691 | B2 * | 4/2017 | Berelejis | H04L 12/2807 |
| 10,148,495 | B1 * | 12/2018 | Oczkowski | H04W 8/20 |
| 10,827,539 | B2 * | 11/2020 | Vyas | H04W 76/11 |
| 11,405,789 | B1 * | 8/2022 | Wei | H04W 4/50 |
| 2010/0325425 | A1 | 12/2010 | Park et al. | |
| 2013/0286889 | A1 * | 10/2013 | Cherian | H04L 63/18 |
| | | | | 370/254 |
| 2014/0328257 | A1 * | 11/2014 | Kamlani | H04W 76/10 |
| | | | | 370/329 |
| 2014/0337950 | A1 | 11/2014 | Yang et al. | |
| 2015/0085725 | A1 * | 3/2015 | Estevez | H04W 52/0206 |
| | | | | 370/311 |
| 2015/0146706 | A1 * | 5/2015 | Goluboff | H04W 36/033 |
| | | | | 370/338 |
| 2016/0192191 | A1 * | 6/2016 | Lee | H04L 63/083 |
| | | | | 726/7 |
| 2017/0257819 | A1 * | 9/2017 | McCann | H04L 67/56 |
| 2020/0314743 | A1 | 10/2020 | Baki et al. | |
| 2021/0006903 | A1 * | 1/2021 | Liu | H04N 21/43615 |
| 2022/0239473 | A1 * | 7/2022 | Beredimas | G06F 21/44 |
| 2022/0322467 | A1 * | 10/2022 | Madan | H04W 76/14 |
| 2022/0400428 | A1 * | 12/2022 | Madan | H04W 12/55 |
| 2023/0093016 | A1 * | 3/2023 | Shi | H04L 41/12 |
| | | | | 370/329 |
| 2023/0291799 | A1 * | 9/2023 | Li | H04W 48/08 |

OTHER PUBLICATIONS

International Written Opinion for International Application No. PCT/US2023/062290, mailed May 8, 2023, 9 pages.

* cited by examiner

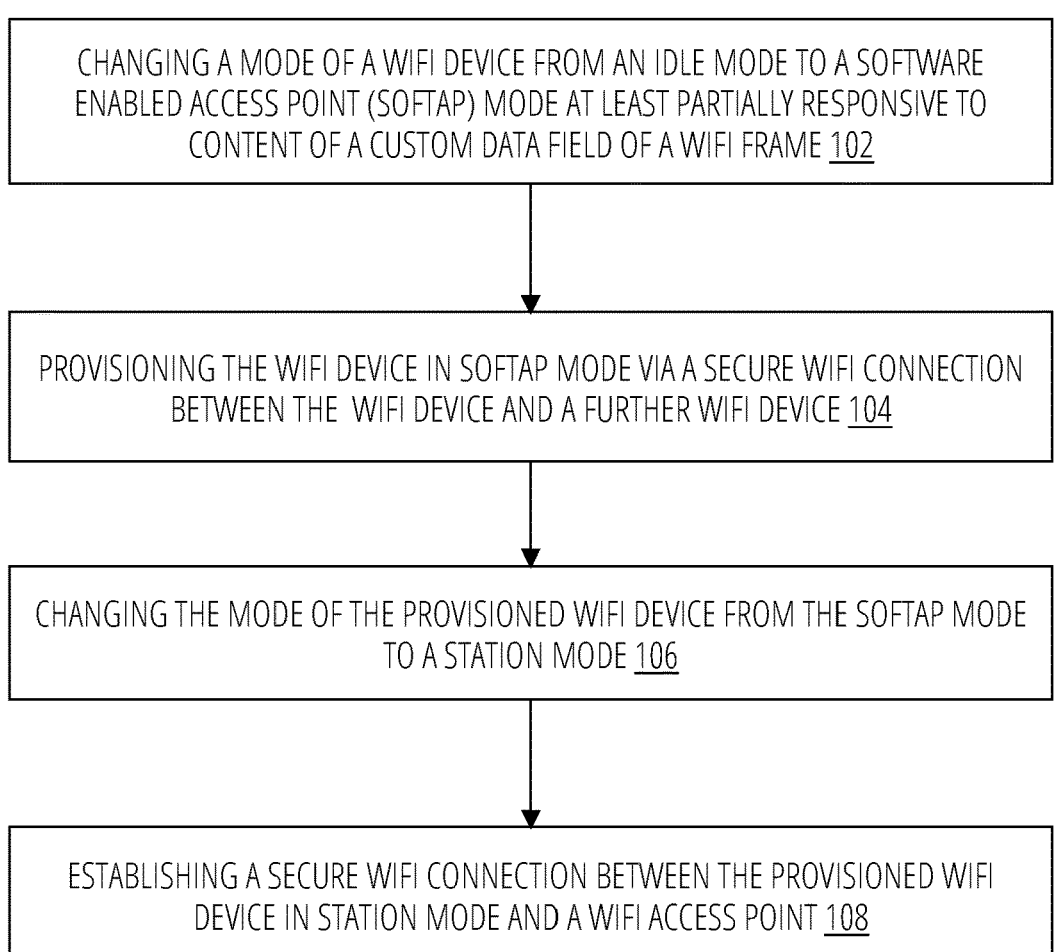

CHANGING A MODE OF A WIFI DEVICE FROM AN IDLE MODE TO A SOFTWARE ENABLED ACCESS POINT (SOFTAP) MODE AT LEAST PARTIALLY RESPONSIVE TO CONTENT OF A CUSTOM DATA FIELD OF A WIFI FRAME 102

PROVISIONING THE WIFI DEVICE IN SOFTAP MODE VIA A SECURE WIFI CONNECTION BETWEEN THE WIFI DEVICE AND A FURTHER WIFI DEVICE 104

CHANGING THE MODE OF THE PROVISIONED WIFI DEVICE FROM THE SOFTAP MODE TO A STATION MODE 106

ESTABLISHING A SECURE WIFI CONNECTION BETWEEN THE PROVISIONED WIFI DEVICE IN STATION MODE AND A WIFI ACCESS POINT 108

FIG. 1

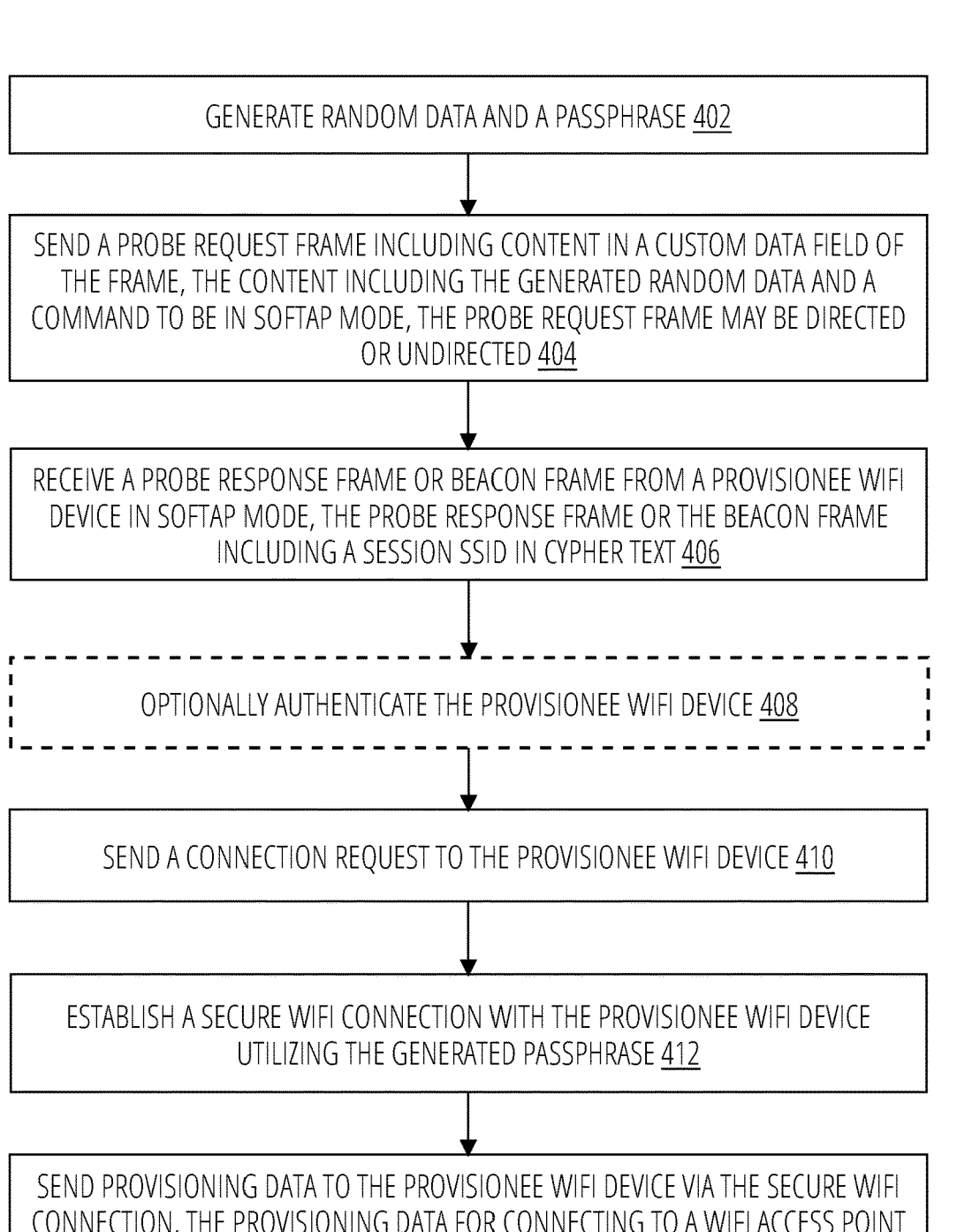

— 400

GENERATE RANDOM DATA AND A PASSPHRASE 402

SEND A PROBE REQUEST FRAME INCLUDING CONTENT IN A CUSTOM DATA FIELD OF THE FRAME, THE CONTENT INCLUDING THE GENERATED RANDOM DATA AND A COMMAND TO BE IN SOFTAP MODE, THE PROBE REQUEST FRAME MAY BE DIRECTED OR UNDIRECTED 404

RECEIVE A PROBE RESPONSE FRAME OR BEACON FRAME FROM A PROVISIONEE WIFI DEVICE IN SOFTAP MODE, THE PROBE RESPONSE FRAME OR THE BEACON FRAME INCLUDING A SESSION SSID IN CYPHER TEXT 406

OPTIONALLY AUTHENTICATE THE PROVISIONEE WIFI DEVICE 408

SEND A CONNECTION REQUEST TO THE PROVISIONEE WIFI DEVICE 410

ESTABLISH A SECURE WIFI CONNECTION WITH THE PROVISIONEE WIFI DEVICE UTILIZING THE GENERATED PASSPHRASE 412

SEND PROVISIONING DATA TO THE PROVISIONEE WIFI DEVICE VIA THE SECURE WIFI CONNECTION, THE PROVISIONING DATA FOR CONNECTING TO A WIFI ACCESS POINT 414

FIG. 4

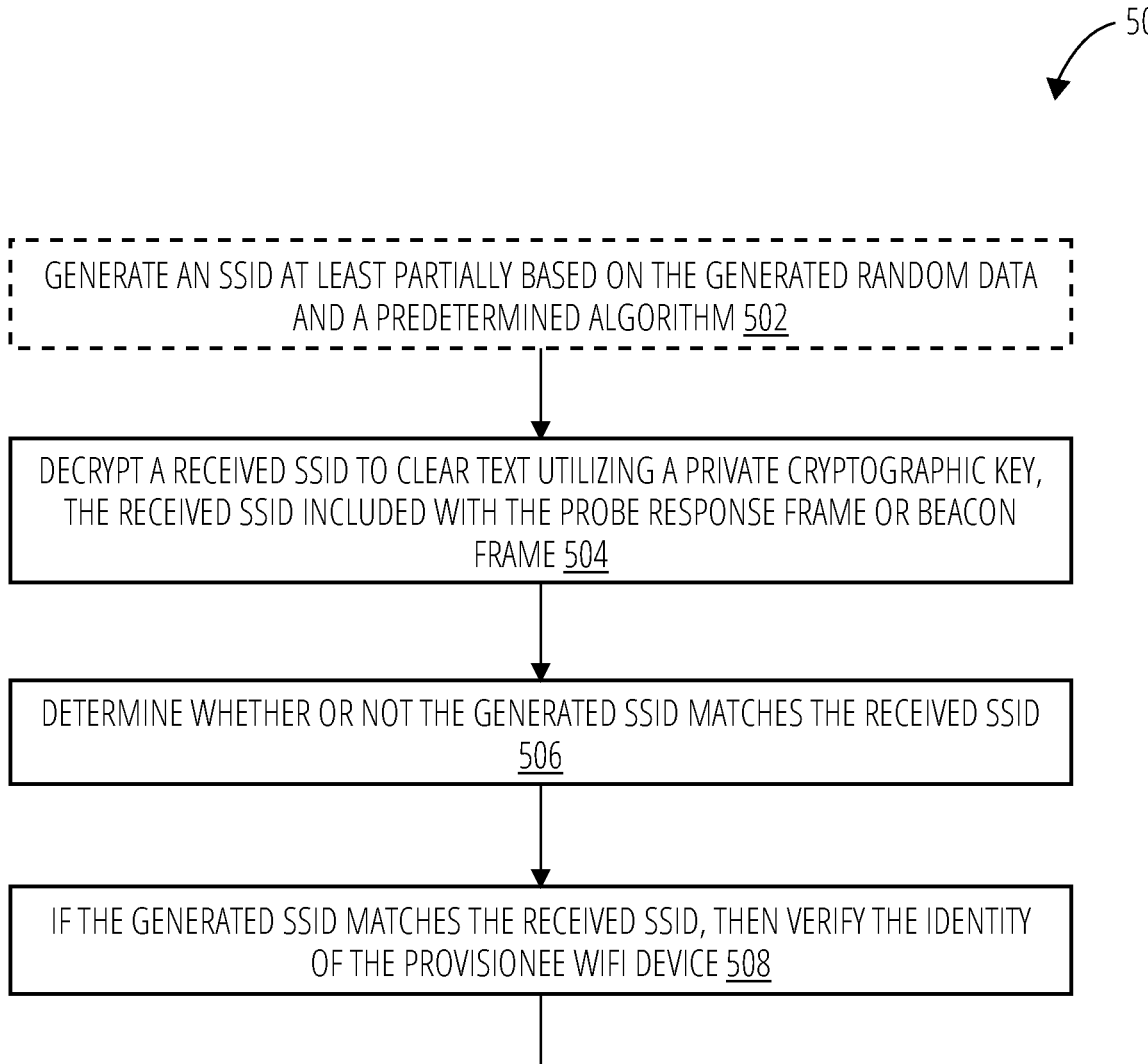

500

GENERATE AN SSID AT LEAST PARTIALLY BASED ON THE GENERATED RANDOM DATA AND A PREDETERMINED ALGORITHM 502

DECRYPT A RECEIVED SSID TO CLEAR TEXT UTILIZING A PRIVATE CRYPTOGRAPHIC KEY, THE RECEIVED SSID INCLUDED WITH THE PROBE RESPONSE FRAME OR BEACON FRAME 504

DETERMINE WHETHER OR NOT THE GENERATED SSID MATCHES THE RECEIVED SSID 506

IF THE GENERATED SSID MATCHES THE RECEIVED SSID, THEN VERIFY THE IDENTITY OF THE PROVISIONEE WIFI DEVICE 508

IF THE GENERATED SSID DOES NOT MATCH THE RECEIVED SSID, THEN DO NOT VERIFY THE IDENTITY OF THE PROVISIONEE WIFI DEVICE 510

FIG. 5

GENERATE RANDOM DATA AND A PASSPHRASE 602

SEND A PROBE REQUEST FRAME INCLUDING CONTENT IN A CUSTOM DATA FIELD OF THE FRAME, THE CONTENT INCLUDING THE GENERATED RANDOM DATA AND A COMMAND TO BE IN SOFTAP MODE, THE PROBE REQUEST FRAME IS AN UNDIRECTED PROBE REQUEST FRAME 604

DETERMINE THAT A PROBE RESPONSE FRAME OR BEACON FRAME WAS NOT RECEIVED FROM A PROVISIONEE WITHIN A PREDETERMINED TIME DURATION 606

SEND A CONNECTION REQUEST UTILIZING A GENERATED SSID, THE GENERATED SSID AT LEAST PARTIALLY BASED ON THE GENERATED RANDOM DATA AND A PREDETERMINED SSID GENERATION ALGORITHM 608

ESTABLISH A SECURE WIFI CONNECTION WITH THE PROVISIONEE WIFI DEVICE UTILIZING THE GENERATED PASSPHRASE 610

SEND PROVISIONING DATA TO THE PROVISIONEE WIFI DEVICE VIA THE SECURE WIFI CONNECTION, THE PROVISIONING DATA FOR CONNECTING TO A WIFI ACCESS POINT 612

FIG. 6

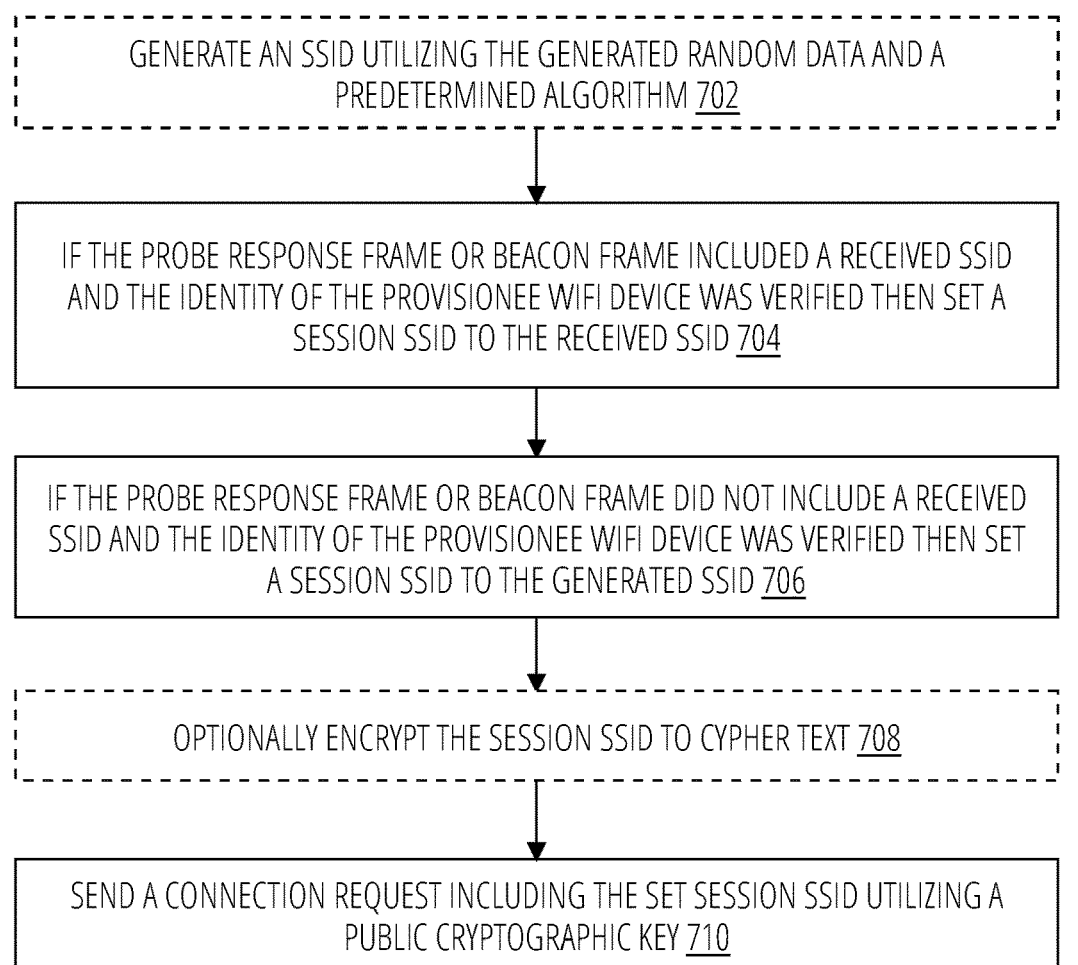

GENERATE AN SSID UTILIZING THE GENERATED RANDOM DATA AND A PREDETERMINED ALGORITHM 702

IF THE PROBE RESPONSE FRAME OR BEACON FRAME INCLUDED A RECEIVED SSID AND THE IDENTITY OF THE PROVISIONEE WIFI DEVICE WAS VERIFIED THEN SET A SESSION SSID TO THE RECEIVED SSID 704

IF THE PROBE RESPONSE FRAME OR BEACON FRAME DID NOT INCLUDE A RECEIVED SSID AND THE IDENTITY OF THE PROVISIONEE WIFI DEVICE WAS VERIFIED THEN SET A SESSION SSID TO THE GENERATED SSID 706

OPTIONALLY ENCRYPT THE SESSION SSID TO CYPHER TEXT 708

SEND A CONNECTION REQUEST INCLUDING THE SET SESSION SSID UTILIZING A PUBLIC CRYPTOGRAPHIC KEY 710

FIG. 7

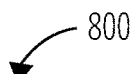

800

RECEIVE A PROBE REQUEST FRAME FROM A PROVISIONER WIFI DEVICE, THE PROBE REQUEST FRAME INCLUDING CONTENT IN A CUSTOM DATA FIELD OF THE FRAME, THE CONTENT INCLUDING RANDOM DATA AND A COMMAND TO BE IN SOFTAP MODE 802

AUTHENTICATE THE PROVISIONER WIFI DEVICE 804

GENERATE A SESSION SSID AT LEAST PARTIALLY BASED ON THE RANDOM DATA 806

GENERATE A PASSPHRASE AT LEAST PARTIALLY BASED ON THE RANDOM DATA 808

CHANGE, IN RESPONSE TO THE COMMAND TO BE IN SOFTAP MODE, FROM AN IDLE MODE TO A SOFTAP MODE OR OTHER VIRTUAL ROUTER MODE 810

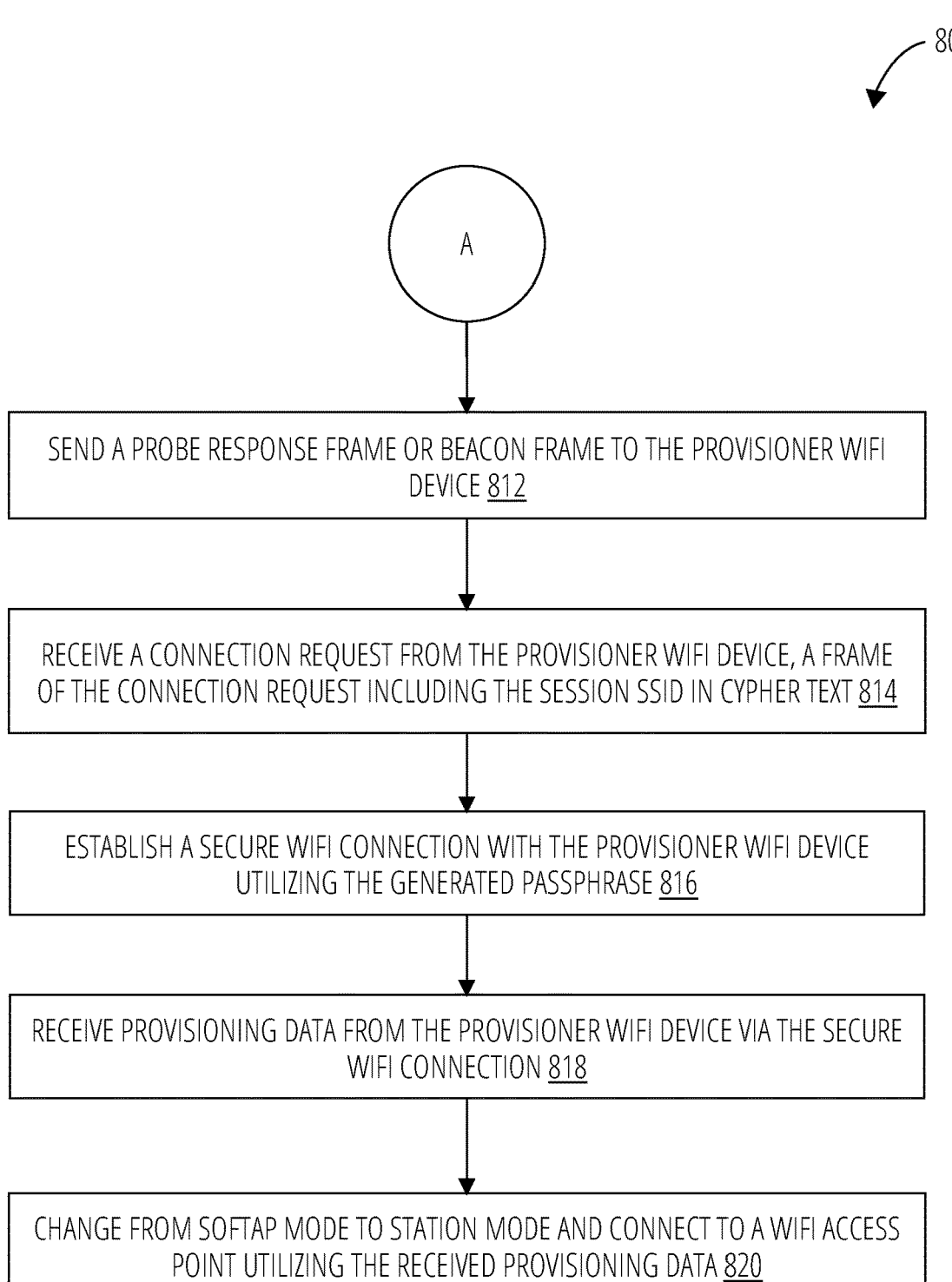

SEND A PROBE RESPONSE FRAME OR BEACON FRAME TO THE PROVISIONER WIFI DEVICE 812

RECEIVE A CONNECTION REQUEST FROM THE PROVISIONER WIFI DEVICE, A FRAME OF THE CONNECTION REQUEST INCLUDING THE SESSION SSID IN CYPHER TEXT 814

ESTABLISH A SECURE WIFI CONNECTION WITH THE PROVISIONER WIFI DEVICE UTILIZING THE GENERATED PASSPHRASE 816

RECEIVE PROVISIONING DATA FROM THE PROVISIONER WIFI DEVICE VIA THE SECURE WIFI CONNECTION 818

CHANGE FROM SOFTAP MODE TO STATION MODE AND CONNECT TO A WIFI ACCESS POINT UTILIZING THE RECEIVED PROVISIONING DATA 820

FIG. 8B

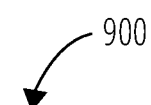

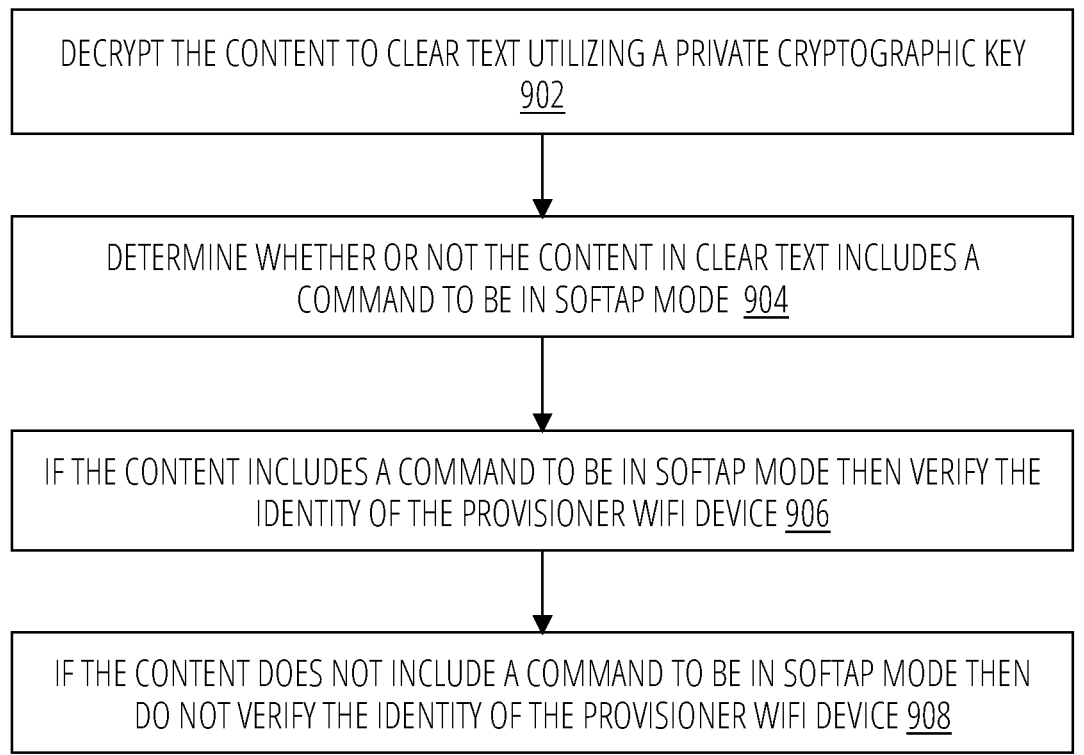

DECRYPT THE CONTENT TO CLEAR TEXT UTILIZING A PRIVATE CRYPTOGRAPHIC KEY
902

DETERMINE WHETHER OR NOT THE CONTENT IN CLEAR TEXT INCLUDES A
COMMAND TO BE IN SOFTAP MODE 904

IF THE CONTENT INCLUDES A COMMAND TO BE IN SOFTAP MODE THEN VERIFY THE
IDENTITY OF THE PROVISIONER WIFI DEVICE 906

IF THE CONTENT DOES NOT INCLUDE A COMMAND TO BE IN SOFTAP MODE THEN
DO NOT VERIFY THE IDENTITY OF THE PROVISIONER WIFI DEVICE 908

FIG. 9

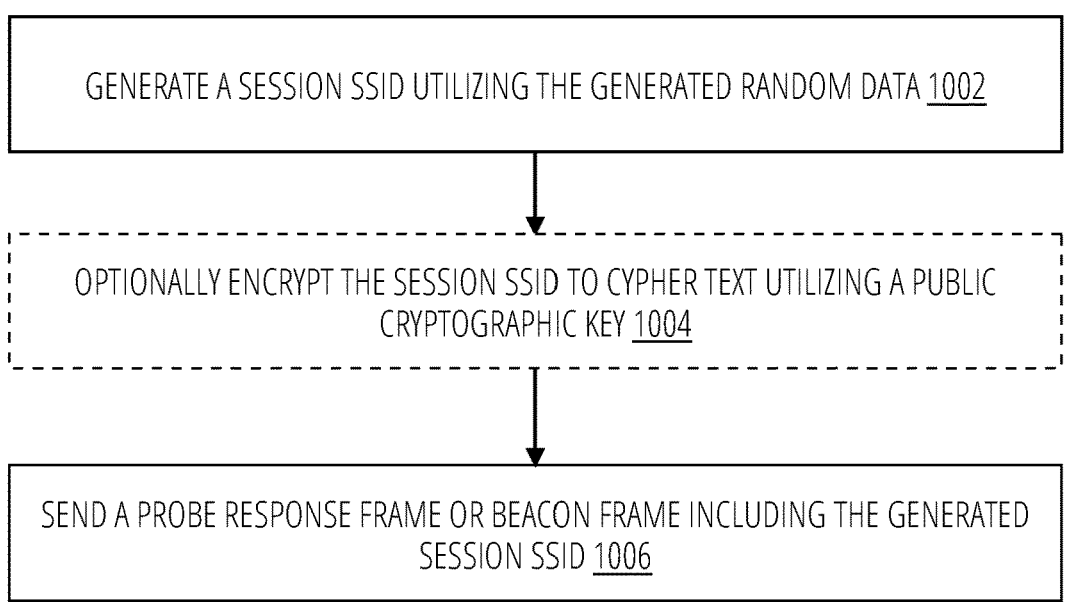

GENERATE A SESSION SSID UTILIZING THE GENERATED RANDOM DATA 1002

OPTIONALLY ENCRYPT THE SESSION SSID TO CYPHER TEXT UTILIZING A PUBLIC CRYPTOGRAPHIC KEY 1004

SEND A PROBE RESPONSE FRAME OR BEACON FRAME INCLUDING THE GENERATED SESSION SSID 1006

FIG. 10

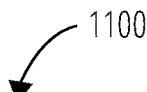

SEND A PROBE RESPONSE FRAME OR BEACON FRAME INCLUDING A PREDETERMINED IDENTIFIER IN CYPHER TEXT IN A CUSTOM DATA FIELD OF THE FRAME 1102

FIG. 11

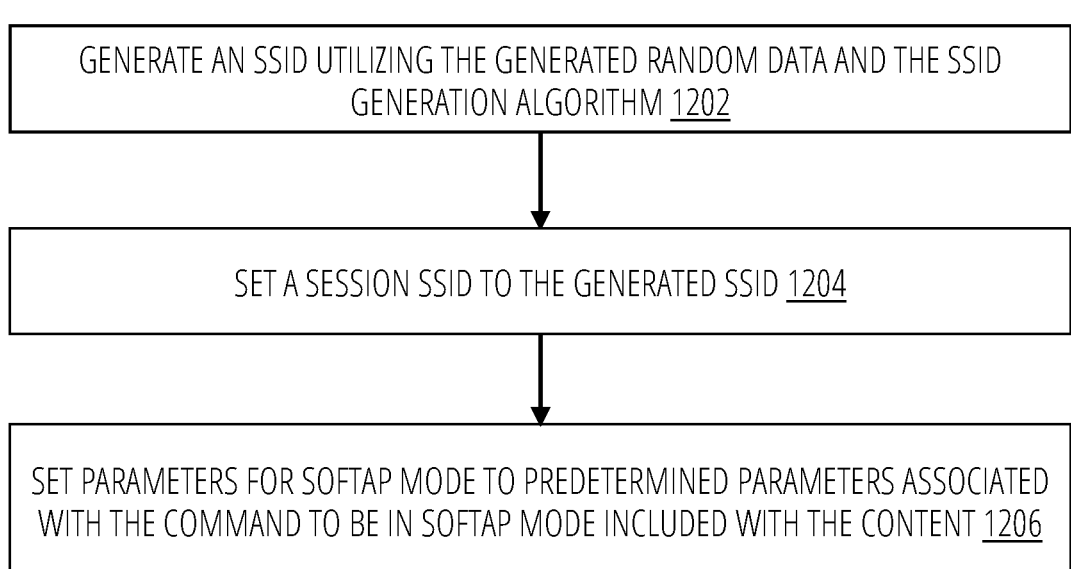
GENERATE AN SSID UTILIZING THE GENERATED RANDOM DATA AND THE SSID GENERATION ALGORITHM <u>1202</u>
SET A SESSION SSID TO THE GENERATED SSID <u>1204</u>
SET PARAMETERS FOR SOFTAP MODE TO PREDETERMINED PARAMETERS ASSOCIATED WITH THE COMMAND TO BE IN SOFTAP MODE INCLUDED WITH THE CONTENT <u>1206</u>
FIG. 12

| ELEMENT VALUE | LENGTH VALUE | ORG VALUE | CONTENT |
|---|---|---|---|
| ELEMENT ID | LENGTH | ORG. ID | VENDOR SPECIFIC CONTENT |

| SSID VALUE | NULL | RANDOM DATA |
|---|---|---|
| ELEMENT ID | LENGTH | SSID |

1500

| <CMD> | <SSID INPUT> | <PASSPHRASE INPUT> |
|---|---|---|
| <u>1502</u> | <u>1504</u> | <u>1506</u> |

PROCESSOR 1618

COMMAND CODES 1630

GENERATED SSID 1614

GENERATED PASSPHRASE 1616

PUBLIC KEY 1624

PRIVATE KEY 1608

RANDOM DATA 1610

RANDOM DATA GENERATION PROCESS 1622

SSID GENERATION PROCESS 1626

PASSPHRASE GENERATION 1628

WIFI CONNECTION PROCESS 1604

PROVISIONING PROCESS 1606

MACHINE-EXECUTABLE INSTRUCTIONS 1620

MEMORY 1612

PROVISIONER WIFI DEVICE 1602

1700

PROCESSOR 1724

WIFI SOFTAP MODE 1708

WIFI STATION MODE 1710

SSID GENERATION PROCESS 1728

PASSPHRASE GENERATION PROCESS 1730

WIFI CONNECTION PROCESS 1704

PROVISIONING PROCESS 1706

MACHINE-EXECUTABLE INSTRUCTIONS 1722

TABLE OF COMMAND CODES 1732

GENERATED SSID 1718

GENERATED PASSPHRASE 1720

PUBLIC KEY 1726

PRIVATE KEY 1712

RANDOM DATA 1714

MEMORY 1716

PROVISIONEE WIFI DEVICE 1702

INITIATING SOFTAP MODE PROVISIONING OF WIFI DEVICE VIA CUSTOM DATA FIELD

CROSS-REFERENCE TO RELATED APPLICATION

This application claims priority to commonly owned U.S. Provisional Patent Application Ser. No. 63/267,800, filed Feb. 10, 2022, the contents and disclosure of which is incorporated herein in its entirety by this reference.

TECHNICAL FIELD

One or more examples relate, generally, to connecting a WiFi device to a WiFi router access point and a WiFi network more generally. One or more examples relate to a provisioner WiFi device providing a provisionee WiFi device with provisioning data for connecting to the WiFi router access point. One or more examples relate to the provisioner WiFi device and the provisionee WiFi device establishing a secure WiFi connection, and sending and receiving provisioning data via the same.

BACKGROUND

There is an ever-expanding variety of devices that connect to an electronic network, such as wireless local area networks (WLAN). Such a network is typically managed by a router, a device that, among other things, routes traffic (data packets) and manages requests by devices to connect to the network. Devices typically connect to a router via wired or unwired connections such as cables and wireless transmissions of various frequencies. Access points are devices that provide wireless connectivity between devices and a router. An access point typically has a wired connection to a router (e.g., an internal connection if a router has a built-in access point, or an Ethernet cable for a stand-alone access point, without limitation) and equipment to communicate wirelessly with other devices. Access points and other devices may be configured to use a variety of wireless communication protocols, but it is common for access points in residential and business networks to use communication protocols that are complaint with one of the Institute of Electrical and Electronics Engineers (IEEE) 1802.11 standards for implementing WLAN computer communication, referred to as "WiFi."

BRIEF DESCRIPTION OF THE DRAWINGS

To easily identify the discussion of any particular element or act, the most significant digit or digits in a reference number refer to the figure number in which that element is first introduced.

FIG. 1 is a flow diagram depicting a process for initiating software enabled access point (SoftAp) mode provisioner of a WiFi device via a custom data field, in accordance with one or more examples.

FIG. 4 is a flow diagram depicting a process for a provisioner WiFi device to connect with, and provide provisioning data to, a provisionee WiFi device, in accordance with one or more examples.

FIG. 5 is a flow-diagram depicting a process to authenticate a provisionee WiFi device, in accordance with one or more examples.

FIG. 6 is a flow diagram depicting a process for a provisioner WiFi device to connect with, and provide provisioning data to, a provisionee WiFi device, in accordance with one or more examples.

FIG. 7 is a flow-diagram depicting a process for sending a connection request to a provisionee WiFi device in SoftAp mode, in accordance with one or more examples.

FIG. 8A and FIG. 8B are flow diagrams depicting a process for a provisionee WiFi device to connect with, and receive provisioning data from, a provisioner WiFi device, in accordance with one or more examples.

FIG. 9 is a flow diagram depicting a process to authenticate a provisioner WiFi device, in accordance with one or more examples.

FIG. 10 is a flow diagram depicting a process to send a probe response frame or beacon frame to a provisioner WiFi device, in accordance with one or more examples.

FIG. 11 is a flow diagram depicting a process to send a probe response frame or beacon frame to a provisioner WiFi device, in accordance with one or more examples.

FIG. 12 is a flow diagram depicting a process to switch to SoftAp mode, in accordance with one or more examples.

DETAILED DESCRIPTION

Figure 2:
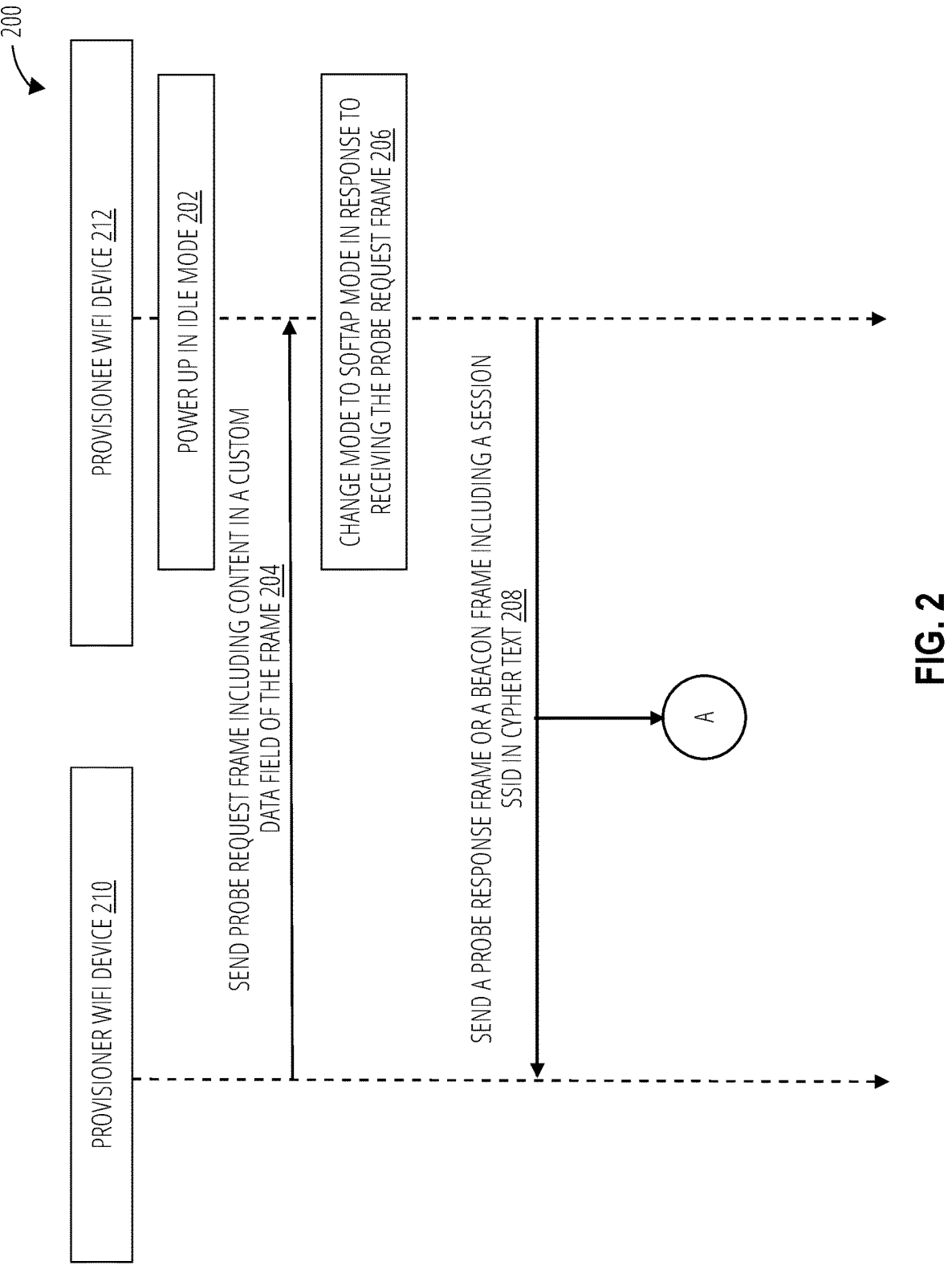
FIG. 2 and FIG. 3 are flow diagrams depicting a process for using a SoftAP mode at a provisionee WiFi device to receive provisioning data for a WiFi router from a provisioner WiFi device, in accordance with one or more examples.

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example, or this disclosure, to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are example only and should not be construed as the only way to implement the present disclosure unless specified otherwise herein. Additionally, block definitions and partitioning of logic between various blocks are examples of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented utilizing any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

In this description the term "coupled" and derivatives thereof may be utilized to indicate that two elements co-operate or interact with each other. When an element is described as being "coupled" to another element, then the elements may be in direct physical or electrical contact or there may be intervening elements or layers present. In contrast, when an element is described as being "directly coupled" to another element, then there are no intervening elements or layers present. The terms "on" and "connected" may be utilized in this description interchangeably with the term "coupled," and have the same meaning unless expressly indicated otherwise or the context would indicate otherwise to a person having ordinary skill in the art.

Any reference to an element herein utilizing a designation such as "first," "second," and so forth does not limit the quantity or order of those elements, unless such limitation is explicitly stated. Rather, these designations may be utilized herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As utilized herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

A router that has an internal access point or is coupled to a stand-alone access point is referred to herein as a "wireless router," and the access point of a wireless router is referred to herein as a "wireless router access point." A wireless router configured for WiFi connections is referred to herein as a "WiFi router," and an access point of a WiFi router is referred to herein as a "WiFi router access point." In one or more examples discussed herein, a WiFi router may have one or multiple (more than one) WiFi router access points, that provide the same or different types of connectivity such as, 2.5-Ghz frequency band, 5-Ghz frequency band, secured, and unsecured, without limitation. A "WiFi device" is a device capable of a WiFi connection (e.g., a secure WiFi connection, without limitation) to a WiFi router access point.

Among other things, WiFi routers are utilized by connected WiFi devices to communicate with each other, and to communicate via connections with networks connected to the WiFi router and external networks connected therewith, such as the Internet (and more specifically to one or more Internet Service Providers (ISPs)), without limitation. A WiFi router's connection with an external network enables a WiFi router, and WiFi devices connected to the WiFi router, to communicate with external networks and devices and services (e.g., Cloud services, without limitation) connected thereto.

When a WiFi device desires to connect to an access point or a WiFi network more generally, typically, it probes WiFi signals and WiFi channels in its vicinity for an IEEE 802.11 wireless local area network (WLAN) service set identifier (SSID) broadcast by the access point that defines a WiFi network. When the WiFi device detects an SSID on a WiFi channel, it sends a connection request to the access point utilizing the detected SSID and channel of the access point to identify the WiFi device to the access point and notify the access point that the WiFi device requests to connect to the WiFi router access point.

When the access point notifies the WiFi device that the access point is ready for the WiFi device to attempt to connect, the WiFi device sends the access point a description of the WiFi device's communication capabilities. If the capabilities are acceptable to the access point, the access point assigns and sends the WiFi device an identifier, and notifies the WiFi device that the capabilities are acceptable, and that the WiFi device may continue the connection process. The process of the WiFi device identifying itself and intention to connect to the access point, determining capabilities, and the access point assigning and sending an identifier to the WiFi device, is sometimes referred to as authentication and association.

Authentication serves to verify that the WiFi device has correct credentials (e.g., a passphrase, without limitation) for the access point. Multiple techniques are available, and in use, for authentication.

As a non-limiting example, the WiFi device and WiFi router access point may perform a key agreement protocol whereby each party contributes some information and then the parties perform a series of steps using the contributions and a shared secret (e.g., a WiFi password, without limitation) to generate encryption/decryption keys. If the WiFi device has the same shared secret as the WiFi router access point and performs the same key agreement protocol as the WiFi router access point, then the keys generated by the WiFi router access point and the WiFi device should be "symmetric." If the parties generate a set of symmetric keys, then the WiFi device should generate decryption keys that can be used to decrypt messages encrypted by the WiFi router access point using the WiFi router access point's generated encryption keys; and generate encryption keys to encrypt messages that the WiFi router access point can decrypt using the WiFi router access point's generated decryption keys. These sets of cryptographic keys are the session keys. In the context of WiFi, a typical key agreement protocol is the Extensible Authentication Protocol over Lan (EAPOL) handshake, also known as a "4-way handshake," so named because of four messages comprising EAPOL key frames exchanged between the "authenticator" (e.g., the access point) and the "supplicant" (e.g., the WiFi device).

As another non-limiting example, a WiFi router access point and a WiFi device may perform a challenge-response protocol. In a challenge-response protocol the WiFi router access point sends the WiFi device a challenge that includes a challenge text that the WiFi device is supposed to encrypt using access point credentials and send back to the WiFi router access point. If the WiFi device and WiFi router access point have the same credentials, then when the WiFi router access point decrypts the encrypted response text it should recover the challenge text. Recovering the challenge text authenticates the WiFi device and the WiFi device and WiFi router access point may establish a secure communication link.

provisioner a WiFi device, i.e., providing data to, or gathering data from, a wireless device to assist with a connection to a WiFi router access point, is sometimes required because, as non-limiting examples, WiFi router access points are typically capable of communication via a variety of wireless frequency bands and logical channels and often employ security measures (e.g., access point credentials) to restrict access to WiFi router access point and a WiFi network, more generally. The provisioner process requires receiving the data (referred to herein as "provisioning data") at a WiFi device so that the wireless device can perform the operations to connect to the wireless router access point as discussed above.

Headless and zero UI (user interface) devices are devices configured to operate without a physical local interface such as a monitor, keyboard, computer mouse, buttons, touchpad, or touchscreen, without limitation. They may have some local interfacing capability via voice, gestures, or movement—but many such devices operate without any physical local interface. Such a device is referred to herein as a "headless device," and a headless device that is configured for WiFi connections is referred to herein as a "headless WiFi device."

A headless WiFi device does not have a physical local interface usable to input the provisioning data. While some headless WiFi device can at least partially provision themselves, such devices known to the inventor of this disclosure require the assistance of another device that has a physical local interface, and a provisioner device capable of WiFi communication and providing the WiFi router access point credentials is referred to herein as a "provisioner WiFi device." The headless WiFi device receiving the WiFi router access point credentials from the provisioner WiFi device is referred to herein as a "provisionee WiFi device."

As used herein "random data" means data generated utilizing a random data generator or pseudo-random data generator. A non-limiting example of random data is a string generated by a random string generator or a pseudo-random data generator. A further non-limiting example of random data is raw binary data generated by a random raw binary data generator or a pseudo-random raw binary data generator. Any suitable source of randomness for given operating conditions may be utilized by such a pseudo-random data generator or a random data generator.

At operation 102, process 100 includes changing a mode of a WiFi device from an idle mode to a Software Enabled Access Point (SoftAp) mode at least partially responsive to content of a custom data field of a WiFi frame.

A non-limiting example of idle mode is an unconnected Station (STA) mode. When in a connected STA mode, the WiFi device may scan for available WiFi networks but not connect to any of them. In unconnected STA mode, the WiFi device is not associated with an access point and is not able to transmit data. It is typically used for network discovery or to switch between multiple networks.

FIG. 1 is a flow diagram depicting a process 100 for initiating software enabled access point (SoftAp) mode provisioner of a WiFi device via a custom data field, in accordance with one or more examples.

Although the example process 100 depicts a particular sequence of operations, the sequence may be altered without departing from the scope of the present disclosure. For example, some of the operations depicted may be performed in parallel or in a different sequence that does not materially affect the function of the process 100. In other examples, different components of an example device or system that implements the process 100 may perform functions at substantially the same time or in a specific sequence.

At operation 102, process 100 includes changing a mode of a WiFi device from an idle mode to a software enabled access point (SoftAP) mode at least partially responsive to content of a custom data field of a WiFi frame.

A WiFi frame is a frame defined by IEEE 802.11, and may be, as non-limiting examples, a data frame or a management frame, or more specifically, a control frame type management frame.

Idle mode is any mode of operation in which the WiFi device is capable of receiving a WiFi management frame. WiFi management frames are used to manage and control the operation of a WiFi network. WiFi management frames provide information about the WiFi network, its configuration, and the status of connected devices. WiFi management frames are also used to establish, maintain, and terminate connections between stations and access points, and to provide information about the state of a WiFi network. Non-limiting examples of WiFi management frames include beacon frames, probe request frames, probe response frames, association request and response frames, authentication request and response frames, re-association request and response frames, disassociation frames, de-authentication frames, power save poll frames, action frames, and timing advertisement frames.

SoftAp mode is a WiFi mode that enables a device, as a non-limiting example, a headless WiFi device that is not specifically configured as a WiFi router to operate as a virtual router. The present disclosure is not limited to SoftAp mode, and a person having ordinary skill in the art would understand that variations on SoftAp mode and other virtual router modes may be utilized without exceeding the scope of this disclosure.

A non-limiting example of an idle mode is an unconnected Station (STA) mode. When in an unconnected STA mode, a WiFi device may scan for available WiFi networks but not connect to any of them. In unconnected STA mode, the WiFi device is not associated with an access point and is not able to transmit data. Unconnected STA is typically used for network discovery or to switch between networks.

A further non-limiting example of an idle mode is a connected STA mode. When in a connected STA mode, a WiFi device is connected to an access point and a WiFi network of the access point, and may transmit and receive data over the WiFi network. Here, "connected" means the WiFi device is associated with the access point, and authenticated and authorized (e.g., by the router managing the WiFi network, without limitation) to access and communicate via the WiFi network. When connected to the WiFi network, the WiFi device is capable of communication with other devices on the WiFi network and, if it has an Internet Protocol (IP) address assigned to it, with devices connected to the Internet.

A custom data field is a field of a frame, or a field of a frame element, that may include custom data. Custom data is data that is not logically part of the overall stream of data of a communication message, and so may be ignored or undetected unless a receiver knows or has reason to look for it. A custom data field may be understood to be a separate logical communication channel than the channel(s) utilized for a communication message.

As a non-limiting example, the WiFi frame may be a probe request frame (a type of management frame), and the custom data field may be a content field of a Vendor Specific Information Element (VSIE), or an SSID field of a wildcard SSID element. A content field of a VSIE may be utilized for vendor-specific signaling. A wildcard SSID element is an SSID element of a probe request frame where the value in the length field of the SSID element is set (or has been set) to a NULL value. The NULL value in the length field indicates that the probe request frame is not intended for a network with a specific SSID, and at least implies that the SSID field of the SSID element does not include SSID information. So, in the case of a wildcard SSID element, the SSID field is a custom-data field.

In one or more examples, the content of the custom data field may be a command (as discussed below), random data, or a combination thereof.

At operation 104, process 100 includes provisioning the WiFi device in SoftAp mode via a secure WiFi connection between the WiFi device and a further WiFi device. The further WiFi device may be any WiFi device capable of storing provisioning data for communicating and establishing a secure WiFi connection with a WiFi access point, and capable of establishing a secure WiFi connection with the WiFi device in SoftAp mode via which connection it may send the provisioning data to the WiFi device.

Provisioning data may include at least some of the information the WiFi device may utilize to connect with the WiFi router access point and join a WiFi network managed by the WiFi router. For example, a WiFi router access point may be configurable to communicate via a variety of wireless frequency bands and logical channels and may employ security measures (e.g., router credentials, such as an SSID, MAC address filtering, or a passphrase, without limitation) to restrict access to the WiFi router or WiFi network it manages.

At operation 106, process 100 includes changing the mode of the provisioned WiFi device from the SoftAp mode to a station mode. In station mode, the provisioned WiFi device may communicate, and establish a secure WiFi connection, with the WiFi router access point associated with provisioning data received from the further WiFi device.

At operation 108, process 100 includes establishing a secure WiFi connection between the provisioned WiFi device in station mode and a WiFi access point at operation 108. The provisioned WiFi device in station mode may utilize provisioning data received from the further WiFi device in operation 104 to establish the secure WiFi connection with the WiFi access point.

Figure 3:
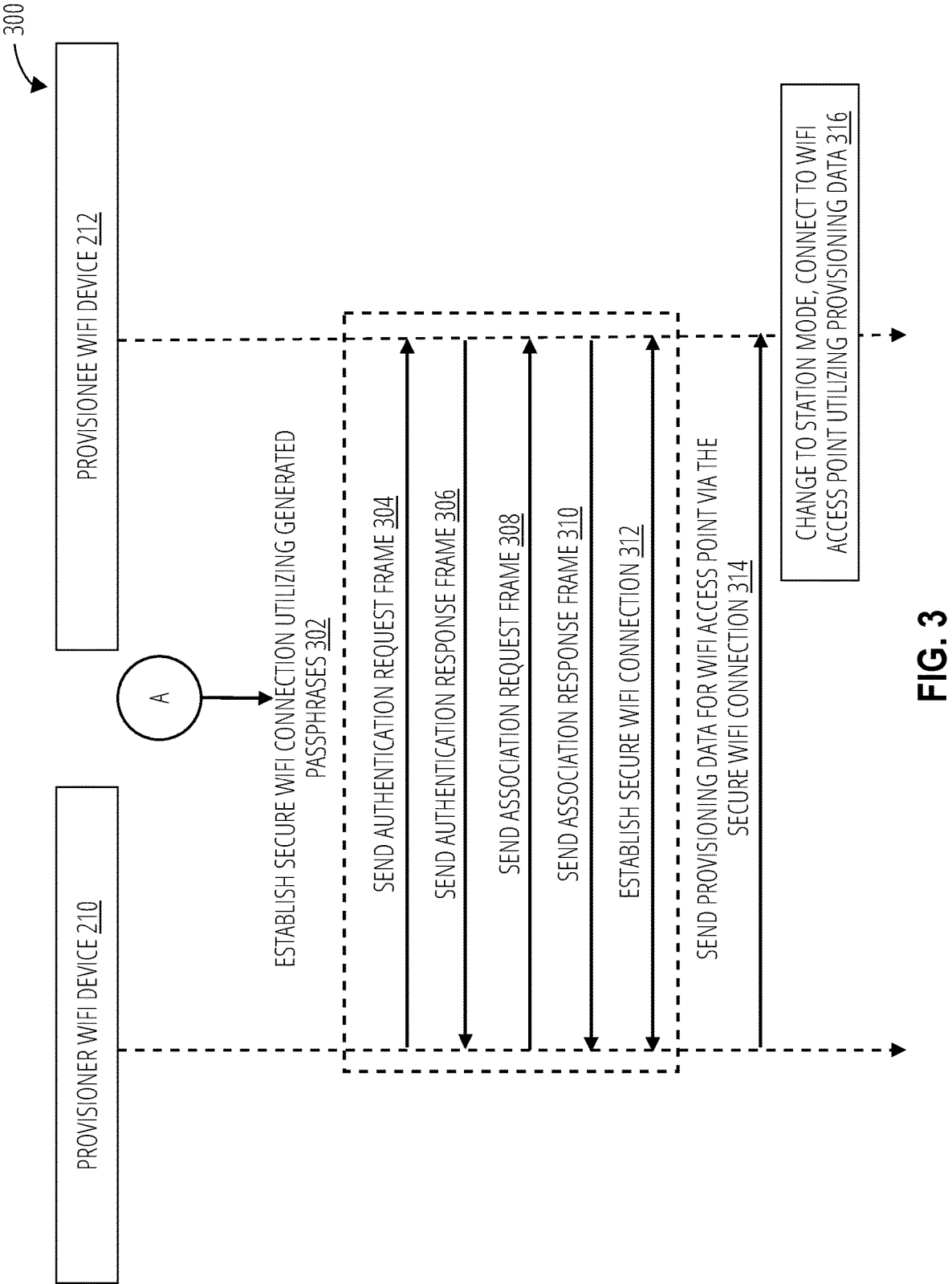

FIG. 2 and FIG. 3 are flow diagrams depicting a process for using a SoftAP mode at a WiFi device (a provisionee WiFi device) to receive provisioning data from a further WiFi device (a provisioner WiFi device), in accordance with one or more examples. In the specific non-limiting example depicted by FIG. 2 and FIG. 3, the provisionee WiFi device is provisionee WiFi device 212 and the provisioner WiFi device is provisioner WiFi device 210.

In one or more examples, provisionee WiFi devices 212 may be a so called "smart" device such as a watch, a fitness tracker, biometrics tracker, physiological monitor (e.g., glucose sensor, without limitation), a wearable device, a home appliance, a printer, an audio speaker, an audio receiver, a camera, a door lock, a door bell, a light bulb, a sensor (e.g., environmental sensor, utility sensor, security sensor, without limitation), a WiFi extender, a radio node of a WiFi mesh network, or controller module (e.g., a utility controller, a lighting controller, security system controller, media controller, without limitation), without limitation. In the case of the aforementioned examples, such a smart WiFi device may include a touch display or other user interface, or may be a headless WiFi device. In one or more examples, provisionee WiFi device 212 may be a smart phone, a tablet computer, a personal computer, or a smart television.

In one or more examples, provisioner WiFi device 210 may be a WiFi enabled device such as a smart phone, a tablet computer, a laptop computer, a desktop computer, a control station, or a wearable device with a physical local interface such as a smart watch, without limitation.

Turning to FIG. 2, at operation 202, provisionee WiFi device 212 powers up in idle mode.

At operation 204, provisioner WiFi device 210 sends, to provisionee WiFi device 212, a probe request frame including content in a custom data field. The probe request frame sent by provisioner WiFi device 210 has an 802.11 probe request frame format and may be characterized herein as an "802.11 probe request frame." As discussed above, the custom data field of the probe request frame may be a content field of a VSIE, or of an SSID field of a wildcard SSID element, without limitation.

In one or more examples, the content included with the probe request frame may include random data and a command to be in SoftAp mode. One or more of the content or the random data or command thereof, may respectively be in clear text or cypher text. In the case of cypher text, content may be encrypted, as a non-limiting example, using certificates and a cryptographic key-based asynchronous encryption techniques. In one or more examples, the command is a command to be in SoftAp mode and may be, as non-limiting examples, a code or text.

At operation 206, provisionee WiFi device 212 changes mode from the idle mode to a software enabled access point (SoftAp) mode or other virtual router mode. In one or more examples, provisionee WiFi device 212 changes mode in response to the command in the content of the probe request frame received from provisioner WiFi device 210.

At operation 208, provisionee WiFi device 212 sends, to provisioner WiFi device 210, a probe response frame or beacon frame. The probe response frame or beacon frame may optionally include a session SSID in cypher text, which is an SSID generated by provisionee WiFi devices 212 utilizing the random data of the content as discussed below. Provisionee WiFi device 212 encrypts the session SSID utilizing a public cryptographic key pre-stored at provisionee WiFi device 212, and for which provisioner WiFi device 210 has a matching private cryptographic key.

In one or more examples, provisionee WiFi devices 212 and provisioner WiFi device 210 may generate and utilize different respective session SSIDs for different connections with each other and with other WiFi devices.

Alternatively, in one or more examples, provisionee WiFi device 212 may send the probe response frame or beacon frame in operation 208 without a session SSID, utilizing a so called "hidden SSID" technique. When a hidden SSID is used, provisionee WiFi device 212 in SoftAp sends a probe response frame or beacon frame, but the SSID field is blank or NULL. This increases security by making the network less visible to third parties (e.g., unauthorized users, users with malicious intent, without limitation).

FIG. 3 is a flow diagram depicting a process 300 that is a continuation of process 200 depicted by the flow diagram of FIG. 2, and so may be understood, in one or more examples, to be part of a same process.

At operation 302, provisioner WiFi device 210 and provisionee WiFi device 212 establish a secure WiFi connection as discussed, below.

Provisioner WiFi device 210 utilizes the same predetermined algorithm and random data to generate the same SSID as provisionee WiFi device 212, and may compare the generated SSID to the session SSID included in the probe response frame or beacon frame. When the provisioner WiFi device 210 detects a match between the generated SSID and the received session SSID, the match authenticates the provisionee SSID to the provisioner WiFi device 210, and indicates to the provisioner WiFi device 210 that it may connect to provisionee WiFi device 212 in SoftAp mode and provision it with provisioning data.

Turning to FIG. 3, operations 304, 306, 308, 310, and 312 relate to establishing the secure WiFi connection mentioned in operation 302. In one or more examples, one or more operations of process 300 may generally follow a standard 802.11 connection phase, and may utilize WPA2 or WPA3 as discussed below.

At operation 304, provisioner WiFi device 210 sends provisionee WiFi device 212 an authentication request frame. The authentication request frame includes information about the identity of provisioner WiFi device 210. In one or more examples, the format of the authentication request frame generally matches the format of an 1802.11 authentication frame.

At operation 306, provisionee WiFi device 212 sends provisioner WiFi device 210 an authentication response frame. The authentication response frame includes information about the identity of provisionee WiFi device 212. In one or more examples, the format of the authentication request frame generally matches the format of an 1802.11 authentication frame.

At operation 308, provisioner WiFi device 210 sends provisionee WiFi device 212 an association request frame. The association request frame includes information about communication capabilities of provisioner WiFi device 210. In one or more examples, the format of the association request frame generally matches the format of an 1802.11 association frame.

At operation 310, provisionee WiFi device 212 sends provisioner WiFi device 210 an association response frame. The association request frame includes information about communication capabilities of provisionee WiFi device 212. In one or more examples, the format of the association request frame generally matches the format of an 1802.11 association frame.

When establishing the secure WiFi connection, provisioner WiFi device 210 and provisionee WiFi device 212 may exchange passphrases respectively generated at least partially based on the random data and a predetermined algorithm (a different predetermined algorithm than utilized to generate the SSIDs). The passphrases may be exchanges, as non-limiting examples, according to a key-agreement exchange protocol (e.g., a 4-way handshake, without limitation) or a challenge-response process, and utilized to generate session cryptographic keys utilized by provisioner WiFi device 210 and provisionee WiFi device 212 to communicate via the secure WiFi connection.

At operation 312, provisioner WiFi device 210 and provisionee WiFi device 212 establish the secure WiFi connection.

At operation 314, provisioner WiFi device 210 sends, to provisionee WiFi device 212, provisioning data for establishing a WiFi connection with a WiFi access point (WiFi access point not depicted in FIG. 3). Provisioning data includes at least some of the information provisionee WiFi device 212 utilizes to connect with the WiFi access point and join a network managed by a router connected to the WiFi access point. For example, a WiFi access point may be configurable to communicate via a variety of wireless frequency bands and logical channels and a router may employ security measures (e.g., router credentials, such as an SSID or a passphrase, without limitation) to restrict access to a WiFi network the router manages.

At operation 316, provisionee WiFi device 212 changes mode to a station mode and utilizes the provisioning data provided in operation 314 to connect to the WiFi access point.

In one or more examples, process 300 may utilize encryption and authentication typical of WiFi Protected Access II (WPA2) standard or WiFi Protected Access III (WPA3) standard. In one or more examples, process 300 may include (e.g., utilize) Temporal Key Integrity Protocol (TKIP) typically used in WPA2 standard, or Advanced encryption Standard (AES) encryption algorithms with a 128-bit key typically used in WPA3 standard. In one or more examples, process 300 may include (e.g., utilize) Simultaneous Authentication of Equals (SAE) authentication protocol typically used in WPA3 standard (SAE provides increased resistance against brute force attacks). In one or more examples, process 300 may include (e.g., utilize) enhanced protection for Small Networks that may otherwise have limited security measures in place, such as Opportunistic Wireless Encryption (OWE), which provides encryption for networks without authentication. In one or more examples, process 300 may include increased password strength that is typically used in WPA3 standard.

FIG. 4 is a flow diagram depicting a process 400 for a provisioner WiFi device (e.g., provisioner WiFi device 210) to connect with, and provide provisioning data to, a provisionee WiFi device (e.g., provisionee WiFi device 212), in accordance with one or more examples. Some or a totality of operations of process 400 may be performed, as a non-limiting example, by provisioner WiFi device 210.

Although the example process 400 depicts a particular sequence of operations, the sequence may be altered without departing from the scope of the present disclosure. For example, some of the operations depicted may be performed in parallel or in a different sequence that does not materially affect the function of the process 400. In other examples, different components of an example device or system that implements the process 400 may perform functions at substantially the same time or in a specific sequence.

At operation 402, process 400 includes generating random data and a passphrase.

In one or more examples, the random data may have at least two identifiable portions, a first portion that is SSID input data, and a second portion that is passphrase input data. The SSID input data is a portion of the random data to be utilized to generate an SSID. The passphrase input data is a portion of the random data to be utilized to generate a passphrase. In or more examples, the random data, including the SSID input data and passphrase input data, may be generated as one block of data in a same random data generation process, or may be generated as two different blocks of data in two different random data generation processes.

The passphrase may be generated at least partially based on the generated random data (or a passphrase input data of the generated random data) and a predetermined passphrase generation algorithm (which may also be referred to herein as a "passphrase generation process"). The passphrase generation algorithm is known to both provisioner WiFi device and provisionee WiFi device, so, in theory, they are both capable of generating the same passphrase.

At operation 404, process 400 includes sending a probe request frame including content in a custom data field of the frame. The content includes the generated random data and a command to be in SoftAp mode. In one or more examples, the probe request frame may be directed or undirected. A directed probe request frame includes an SSID. The SSID may be generated at least partially based on the generated random data and a predetermined SSID generation algorithm (which may also be referred to herein as an "SSIS generation process"). An undirected probe request frame does not include an SSID. Not including an SSID may, as a non-limiting example, increase security.

In one or more examples, the custom data field includes (i.e., is logically separated into): a command field and a random data field. The random data field includes an SSID input field and a passphrase input field. The command field includes the command to be in SoftAp mode. The command to be in SoftAp mode is a code or text that instructs the provisionee WiFi device to be in a SoftAp mode. In one or more examples, a command may include information about, or be pre-associated with, values of parameters for operation in SoftAp mode. Such parameters may include beacon interval, transmit power level, and security mode. In this manner, provisionee WiFi device may operate in SoftAp mode according to different operational parameters and, accordingly, may operate differently.

The SSID input field includes the SSID input data utilized to generate an SSID. The passphrase input field includes the passphrase input data utilized to generate a passphrase. A non-limiting example of a format of the custom data field is discussed with respect to FIG. 15.

At operation 406, process 400 includes receiving a probe response frame or beacon frame from a provisionee WIFI device in SoftAp mode. The probe response frame or beacon frame includes a session SSID in cypher text. If the probe request frame sent in operation 404 was a directed probe request frame, a probe response frame or beacon frame will include a session SSID that matches the SSID in the probe request frame. If the probe request frame sent in operation 404 was an undirected probe request frame, a provisionee WiFi device may, or may not, send a probe response frame or beacon frame that includes a session SSID, for example, the probe response frame or beacon frame will not include a session S SID if the provisionee uses a hidden SSID. Process 600 depicted by FIG. 6 is related to an example where probe response frames or beacon frames do not include a session SSID.

At operation 408, process 400 optionally includes authenticating the provisionee WiFi device. Examples of authenticating a provisionee WiFi device are discussed, below.

At operation 410, process 400 includes sending a connection request to the provisionee WiFi device. In one or more examples, a frame of the connection request may include a session SSID in cypher text. In one or more examples, the connection request may be or include a message of an authentication process (e.g., challenge-response process, key agreement exchange process, or 4-way handshake without limitation) or an association process (e.g., exchanging of management frames and capability frames, without limitation).

At operation 412, process 400 includes establishing a secure WiFi connection with the provisionee WiFi Device utilizing the generated passphrase. In one or more examples, establishing the secure WiFi connection may include determining communicating parameters for a logical communication link between the provisioner WiFi device 210 and provisionee WiFi device 212.

At operation 414, process 400 includes sending provisioning data to the provisionee WiFi device via the secure WiFi connection, the provisioning data for connecting to an access point and a WiFi network thereof.

FIG. 5 is a flow-diagram depicting a process 500 for authenticating a provisionee WiFi device, in accordance with one or more examples.

Although the example process 500 depicts a particular sequence of operations, the sequence may be altered without departing from the scope of the present disclosure. For example, some of the operations depicted may be performed in parallel or in a different sequence that does not materially affect the function of the process 500. In other examples, different components of an example device or system that implements the process 500 may perform functions at substantially the same time or in a specific sequence.

At operation 502, process 500 optionally includes generating an SSID at least partially based on the generated random data and an SSID generation algorithm. As discussed above, generating the SSID at least partially based on the generated random data may include generating the SSID at least partially based on SSID input data. In cases where the probe request frame sent in operation 404 of process 400 was a directed probe request frame, a generated SSID may already exist and may be utilized in process 500.

Provisioner WiFi device and provisionee WiFi device both have the SSID generation algorithm and the random data (or SSID input data), and so can generate the same SSID to use as the session SSID.

At operation 504, process 500 includes optionally decrypting a received SSID to clear text utilizing a private cryptographic key, the received SSID included with the probe response frame or beacon frame.

At operation 506, process 500 includes determining whether or not the generated SSID matches the received SSID. If the received SSID was encrypted utilizing the public cryptographic key of the provisioner WiFi device, and generated utilizing the generated random data and SSID generation algorithm utilized to generate the generated SSID, then the received SSID should match the generated SSID. A determined match serves to verify the identity of the provisionee WiFi device.

At operation 508, process 500 includes if the generated SSID matches the received SSID then verifying the identity of the provisionee WiFi device.

At operation 510, process 500 includes if the generated SSID does not match the received SSID then not verifying the identity of the provisionee WiFi device. In one or more examples, if the identity of the provisionee WiFi device is not verified the authentication fails and the connection process may be terminated.

FIG. 6 is a flow diagram depicting a process for a provisioner WiFi device to connect with, and provide provisioning data to, a provisionee WiFi device, in accordance with one or more examples.

Although the example process 600 depicts a particular sequence of operations, the sequence may be altered without departing from the scope of the present disclosure. For example, some of the operations depicted may be performed in parallel or in a different sequence that does not materially affect the function of the process 600. In other examples, different components of an example device or system that implements the process 600 may perform functions at substantially the same time or in a specific sequence.

As discussed above, in some examples provisionee may use a hidden SSID technique, and so a probe response frame or beacon frame may not include an SSID. In process 600, the provisioner WiFi device sends a connection request utilizing a generated SSID in response to determining that a probe response frame or beacon frame was not received from the provisionee WiFi device within a predetermined time duration. A provisionee WiFi device should receive the connection request if: (a) provisionee WiFi device initiated SoftAp mode in response to the command in provisioner's probe request frame, and, optionally, operating parameters for SoftAp mode are set according to values associated with the command; and (b) provisionee WiFi device generated and set an SSID in response to the random data in provisioner's probe request frame utilizing an SSID generation algorithm known to both provisioner WiFi device and provisionee WiFi device.

At operation 602, process 600 includes generate random data and a passphrase. In one or more examples, operation 602 is substantially the same as operation 402 in process 400.

At operation 604, process 600 includes sending a probe request frame including content in a custom data field of the frame. The content includes the generated random data and a command to be in SoftAp mode. The probe request frame is an undirected probe request frame (does not include an SSID), which increases security. In one or more examples, operation 602 is substantially the same as operation 404 in process 400 except specifically utilizing an undirected probe request frame.

At operation 606, process 600 includes determining that a probe response frame or beacon frame was not received from a provisionee within a predetermined time duration. In some cases, probe response frames or beacon frames may be received by the provisioner, but none of them include information the provisioner uses to identify the provisionee sent them. As a non-limiting example, the provisionee may be utilizing a hidden SSID and so none of the probe response. Any suitable duration of time may be utilized for the predetermined time duration based on operating conditions.

At operation 608, process 600 includes sending a connection request utilizing a generated SSID, the generated SSID at least partially based on the generated random data and a predetermined SSID generation algorithm. In one or more examples, process 600 may optionally include generating the SSID at least partially based on the generated random data and the predetermined SSID generation algorithm. In some cases, an SSID may have been generated already, for example, to authenticate the senders of probe response frames or beacon frame. In one or more examples, operation 602 is substantially the same as operation 410 in process 400.

At operation 610, process 600 includes establishing a secure WiFi connection with the provisionee WiFi Device utilizing the generated passphrase. In one or more examples, operation 602 is substantially the same as operation 412 in process 400.

At operation 612, process 600 includes sending provisioning data to the provisionee WiFi device via the secure WiFi connection, the provisioning data for connecting to an access point and a WiFi network thereof.

FIG. 7 is a flow-diagram depicting a process 700 for sending a connection request to a provisionee WiFi device in SoftAp mode, in accordance with one or more examples.

Although the example process 700 depicts a particular sequence of operations, the sequence may be altered without departing from the scope of the present disclosure. For example, some of the operations depicted may be performed in parallel or in a different sequence that does not materially affect the function of the process 700. In other examples, different components of an example device or system that implements the process 700 may perform functions at substantially the same time or in a specific sequence.

As discussed, above, if provisionee WiFi device and provisionee WiFi device have the same random data and SSID generation algorithm, they can generate the same SSID. If the provisioner WiFi device authenticates the provisionee WiFi device utilizing the SSIDs then it can set the session SSID to be the same as the received SSID. If the provisioner WiFi device authenticates the provisionee WiFi device utilizing the predetermined identifier, then it assumes provisionee WiFi device has the same random data and SSID generation algorithm and generates an SSID to use as the session SSID. In either case, provisioner WiFi device generates an SSID.

At operation 702, process 700 includes generating an SSID utilizing the generated random data (or an SSID input data of the random data) and an SSID generation algorithm.

At operation 702, process 700 includes, if the probe response frame or beacon frame included a received SSID and the identity of the provisionee WiFi device was verified then set a session SSID to the received SSID.

At operation 704, process 700 includes, if the probe response frame or beacon frame did not include a received SSID and the identity of the provisionee WiFi device was verified then set a session SSID to the generated SSID.

At operation 706, process 700 includes optionally encrypting the session SSID to cypher text utilizing a public cryptographic key of the provisionee WiFi device.

At operation 708, process 700 includes sending the connection request including the set session SSID.

FIG. 8A and FIG. 8B are flow diagrams depicting a process 800 for a provisionee WiFi device to connect with, and receive provisioning data from, a provisioner WiFi device, in accordance with one or more examples. Some or a totality of operations of process 400 may be performed, as a non-limiting example, by provisionee WiFi device 212.

Although the example process 800 depicts a particular sequence of operations, the sequence may be altered without departing from the scope of the present disclosure. For example, some of the operations depicted may be performed in parallel or in a different sequence that does not materially affect the function of the process 800. In other examples, different components of an example device or system that implements the process 800 may perform functions at substantially the same time or in a specific sequence.

At operation 802, process 800 includes receiving a probe request frame from a provisioner WiFi device, the probe request frame including random data in a custom data field of the frame. In one or more examples, the random data has identifiable fields, including a command field, an SSID input field, and a passphrase input field. The command field includes a command (e.g., in the form of text, string, or number, without limitation) that instructs the provisionee WiFi device to be (e.g., stay in, or change to, without limitation) a SoftAp mode. The SSID input field includes a portion of random data utilized to generate an SSID. The passphrase input field includes a further portion of random data utilized to generate a passphrase.

In one or more examples, the SSID input field and passphrase input field may be different fields, include the same or different random data, and the same or different random data may be utilized to generate the SSID and the passphrase. Alternatively, in one or more examples, the SSID input field and passphrase input field may be the same field, include the same random data, and the same random data may be utilized to generate the SSID and the passphrase.

At operation 806, process 800 includes generating an SSID (a provisionee SSID) at least partially based on the random data included in the custom data field of the probe request frame and a predetermined algorithm. More specifically, the portion of random data in the SSID input field may be utilized to generate the provisionee SSID. The predetermined algorithm is known to both provisioner WiFi device of process 400 and the provisionee WiFi device of process 800, so they can generate the same SSID to be the session SSID.

At operation 808, process 800 includes generating a passphrase at least partially based on the random data and a passphrase generation algorithm. More specifically, the portion of random data in the passphrase input field may be utilized to generate the provisionee SSID. The passphrase generation algorithm is known to both provisioner WiFi device of process 400 and the provisionee WiFi device of process 800, so they can generate the same passphrase. As discussed above, the passphrase generation algorithm is different than the predetermined algorithm utilized to generate the SSID.

At operation 810, process 800 includes changing mode from an idle mode to a SoftAp mode or other virtual router mode, in response to the command to be in SoftAp mode included with the probe request frame received in operation 802.

At operation 812, process 800 includes sending a beacon frame or a probe response frame to the provisioner WiFi device, the beacon frame or probe response frame including the generated SSID in cypher text. The SSID may be encrypted via a public cryptographic key stored at the provisionee WiFi device, and which is a match to a private cryptographic key stored at the provisioner WiFi device.

Alternatively, in one or more examples, the probe response frame sent in operation 812 does not include the SSID in cypher text or otherwise, utilizing a "hidden" SSID. When using a hidden SSID a predetermined identifier in cypher text may be included in a custom data field of the probe response frame or beacon frame.

At operation 814, process 800 includes receiving a connection request from the provisioner WiFi device, a frame of the connection request including the session SSID in cypher text. In some examples, the connection request may be or include a message of an authentication request or association request. As discussed above, the session SSID in the connection request matches the SSID generated in operation 806.

At operation 816, process 800 includes establishing a secure WiFi connection with the provisioner WiFi device utilizing the generated passphrase, which is the session passphrase for this instance of a secure WiFi connection between the provisionee WiFi device and provisioner WiFi device. Different respective SSIDs and passphrase may be generated and utilized in different respective instances of secure WiFi connections between provisionee WiFi device and provisioner WiFi device, and between provisionee WiFi device or provisioner WiFi device and further WiFi devices.

Establishing a secure WiFi connection may include an exchange of passphrases respectively generated by provisioner WiFi device 210 and provisionee WiFi device 212 at least partially based on the random string and predetermined algorithms according to, as non-limiting examples, challenge-response process or key-agreement protocol process (e.g., handshake, without limitation), and thereby generate session cryptographic keys utilized by provisioner WiFi device 210 and provisionee WiFi device 212 to communicate via the secure WiFi connection.

At operation 818, process 800 includes receiving provisioning data from the provisioner WiFi device via the secure WiFi connection.

At operation 820, process 800 includes changing to station mode and connecting to the WiFi router access point utilizing the received provisioning data.

FIG. 9 is a flow diagram depicting a process 900 to authenticate a provisioner WiFi device, in accordance with one or more examples.

Although the example process 900 depicts a particular sequence of operations, the sequence may be altered without departing from the scope of the present disclosure. For example, some of the operations depicted may be performed in parallel or in a different sequence that does not materially affect the function of the process 900. In other examples, different components of an example device or system that implements the process 900 may perform functions at substantially the same time or in a specific sequence.

At operation 902, process 900 includes decrypting the content to clear text utilizing a private cryptographic key.

At operation 902, process 900 includes determining whether or not the content in clear text includes a command to be in SoftAp mode.

At operation 902, process 900 includes if the content includes a command to be in SoftAp mode then verifying the identity of the provisioner WiFi device.

At operation 902, process 900 includes if the content does not include a command to be in SoftAp mode then not verifying the identity of the provisioner WiFi device.

FIG. 10 is a flow diagram depicting a process 1000 to send a probe response frame or beacon frame to a provisioner WiFi device, in accordance with one or more examples.

Although the example process 1000 depicts a particular sequence of operations, the sequence may be altered without departing from the scope of the present disclosure. For example, some of the operations depicted may be performed in parallel or in a different sequence that does not materially affect the function of the process 1000. In other examples, different components of an example device or system that implements the process 1000 may perform functions at substantially the same time or in a specific sequence.

At operation 1002, process 1000 includes generating a session SSID utilizing the generated random data.

At operation 1004, process 1000 includes optionally encrypting the session SSID to cypher text utilizing a public cryptographic key.

At operation 1004, process 1000 includes sending a probe response frame or beacon frame including the generated session SSID.

FIG. 11 is a flow diagram depicting a process 1100 to send a probe response frame or beacon frame to a provisioner WiFi device, in accordance with one or more examples.

Although the example process 1100 depicts a particular sequence of operations, the sequence may be altered without departing from the scope of the present disclosure. For example, some of the operations depicted may be performed in parallel or in a different sequence that does not materially affect the function of the process 1100. In other examples, different components of an example device or system that implements the process 1100 may perform functions at substantially the same time or in a specific sequence.

At operation 1102, process 1100 includes sending a probe response frame or beacon frame including a predetermined identifier in cypher text in a custom data field of the frame.

FIG. 12 is a flow diagram depicting a process 1200 to switch to SoftAp mode, in accordance with one or more examples.

Although the example process 1200 depicts a particular sequence of operations, the sequence may be altered without departing from the scope of the present disclosure. For example, some of the operations depicted may be performed in parallel or in a different sequence that does not materially affect the function of the process 1200. In other examples, different components of an example device or system that implements the process 1200 may perform functions at substantially the same time or in a specific sequence.

At operation 1202, process 1200 includes generating an SSID utilizing the generated random data (or the SSID input data of the random data) and the SSID generation algorithm.

At operation 1204, process 1200 includes setting a session SSID to the generated SSID.

At operation 1206, process 1200 includes setting parameters for SoftAp mode to predetermined parameters associated with the command to be in SoftAp mode included with the content.

In one or more examples, provisionee WiFi device may have pre-stored parameters for operating in SoftAp mode associated with the command to be in SoftAp mode received from the provisioner WiFi device. As a non-limiting example, the provisionee WiFi device may include a table or other data structure that associates respective command codes to respective sets of parameters for operation in SoftAp mode. Each command code is a command to be in SoftAp mode, but may be associated with different values of parameters for operation in SoftAp mode. Such parameters may include beacon interval, transmit power level, and security mode. In this manner, provisionee WiFi device may operate in SoftAp mode according to different operational parameters and, accordingly, may operate differently. Further, in this manner, provisioner WiFi device may control one or more operational parameters of provisionee WiFi device in SoftAp mode via the command of the content included with the probe request frame.

Figure 13:
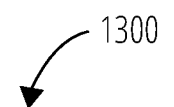
FIG. 13 is a schematic diagram of a probe request frame element of a probe request frame that includes a field for out-of-band data, in accordance with one or more examples.

FIG. 13 is a schematic diagram of a probe request frame element 1300 of a probe request frame that includes a field for out-of-band data, in accordance with one or more examples. Probe request frame element 1300 includes fields for an element identifier ("ELEMENT ID"), length of the content field ("LENGTH"), an organizational identifier ("ORG. ID"), and vendor specific content ("VENDOR SPECIFIC CONTENT"). The format of probe request frame element 1300 generally matches the format of an IEEE 802.11 vendor specific information element (VSIE). The field for vendor specific content includes a random string. In one or more examples, the random string may be a random string generated by a provisioner WiFi device 210 or provisioner WiFi device 1602, without limitation. In one or more examples, probe request frame element 1300 is an example of a frame element that includes a field for out-of-band-data, i.e., the field for vendor specific content, discussed above.

Figure 14:
FIG. 14 is a schematic diagram of a probe request frame element of a probe request frame that includes a field for out-of-band data, in accordance with one or more examples.

FIG. 14 is a schematic diagram of a probe request frame element 1400 of a probe request frame that includes a field for out-of-band data, in accordance with one or more examples. Probe request frame element 1400 includes fields for an element identifier ("ELEMENT ID"), a length ("LENGTH"), and an SSID ("SSID"). The format of probe request frame element 1400 generally matches the format of an IEEE 802.11 SSID element.

As discussed above, when the length field of probe request frame element 1400 is set to NULL, probe request frame element 1400 may be considered a wildcard SSID element, the SSID field a custom data field, and the contents of the SSID field out-of-band-data. Here, the contents of the SSID field is a random string, e.g., a random string generated by a provisioner WiFi device 210 or provisioner WiFi device 1602, without limitation.

It will be appreciated by those of ordinary skill in the art that functional elements of examples disclosed herein (e.g., functions, operations, acts, processes, or methods) may be implemented in any suitable hardware, software, firmware, or combinations thereof.

Figure 15:
FIG. 15 is a schematic block diagram depicting a content, in accordance with one or more examples.

FIG. 15 is a schematic block diagram depicting a content 1500, in accordance with one or more examples. Content 1500 is a non-limiting example of content included the VENDOR SPECIFIC INFORMATION ELEMENT field of probe request frame element 1300.

The content 1500 includes first portion 1502 is a command ("<CMD"), second portion 1504 is an input for the predetermined SSID generation algorithm ("<SSID INPUT>"), and third portion 1506 is an input for the predetermined passphrase generation algorithm ("<PASSPHRASE INPUT>"). In one or more examples, random data utilizing content 1500 may be in clear text or cypher text. In one or more examples, one or more of data in first portion 1502, second portion 1504 or third portion 1506 may respectively be in clear text or cypher text. In one or more examples, the arrangement of first portion 1502, second portion 1504 and third portion 1506 in clear text may be different than a specific arrangement of first portion 1502, second portion 1504 and third portion 1506 when in cypher text.

Figure 16:
FIG. 16 is a schematic block diagram depicting an apparatus for providing a provisionee WiFi device with provisioning data for connecting to a WiFi router, in accordance with one or more examples.

FIG. 16 is a schematic block diagram depicting an apparatus 1600 for providing a provisionee WiFi device with provisioning data for connecting to a WiFi router, in accordance with one or more examples.

Apparatus 1600 includes a provisioner WiFi device 1602. Provisioner WiFi device 1602 includes a memory 1612 and a processor 1618. Memory 1612 stores values for a generated SSID 1614, a generated passphrase 1616, a private key 1608 (private cryptographic key 1608), a public key 1624 (public cryptographic key 1624), and a random string 1610, discussed above. Memory 1612 stores machine-executable instructions 1620, including instructions for: a random data generation algorithm 1622 ("random data generation 1622"), a SSID generation process 1626, a passphrase generation process 1628, a WiFi connection process 1604, and a provisioning process 1606. In one or more examples, WiFi connection process 1604 may include operation 402, operation 404, operation 406, operation 408, operation 410, and operation 412 of process 400. In one or more examples, provisioning process 1606 may include operation 414 of process 400. In one or more examples, random data generation 1622 may generate random data 1610.

Figure 17:
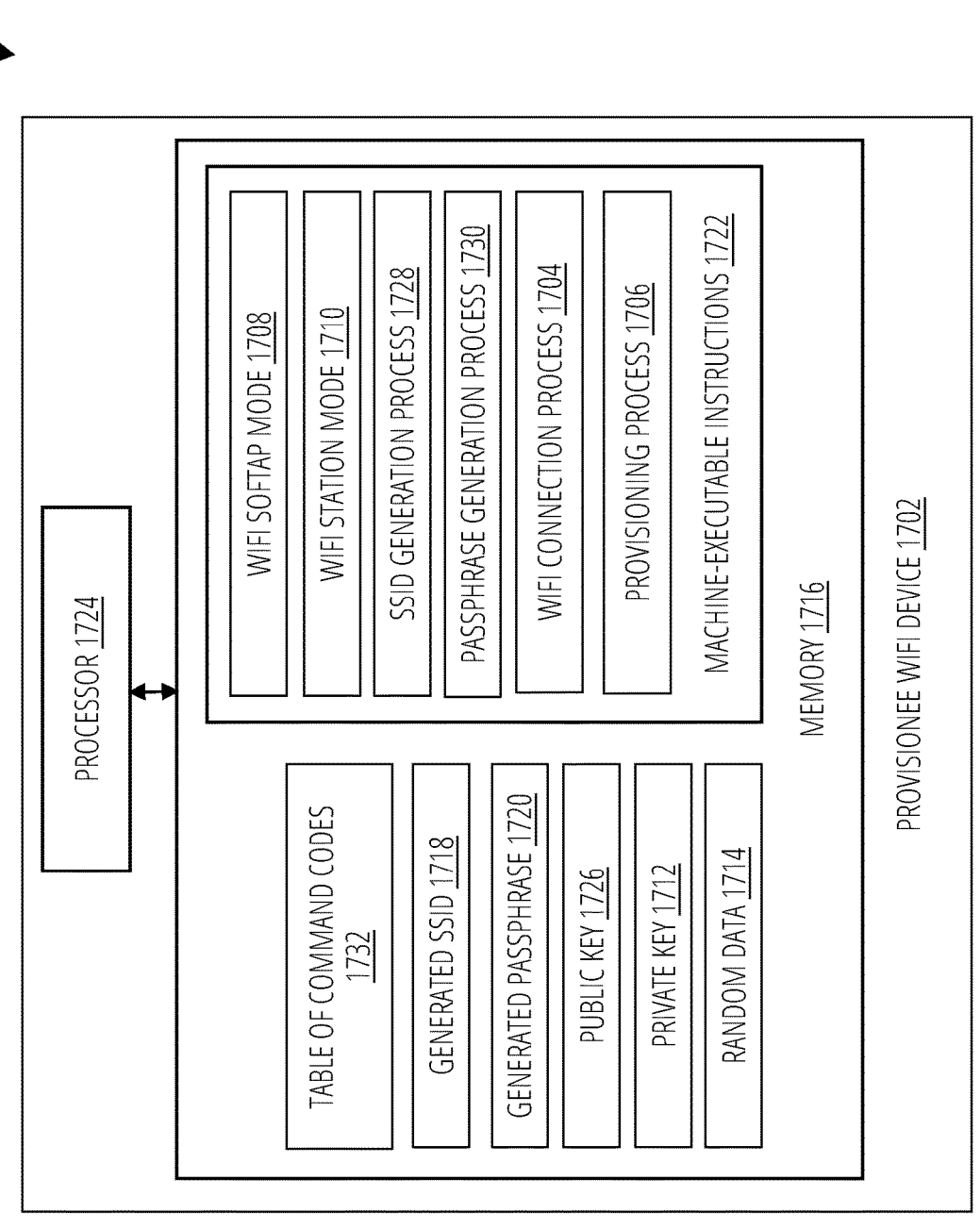
FIG. 17 is a schematic block diagram depicting an apparatus to receive provisioning data for a WiFi router from a provisioner WiFi device, in accordance with one or more examples.

FIG. 17 is a schematic block diagram depicting an apparatus 1700 to receive provisioning data for a WiFi router from a provisioner WiFi device, in accordance with one or more examples.

Apparatus 1700 includes provisionee WiFi device 1702. Provisionee WiFi device 1702 includes processor 1724 and memory 1716. Memory 1716 stores values for generated SSID 1718, generated passphrase 1720, private key 1712 (a private cryptographic key 1712), and a public key 1726 (a public cryptographic key 1726) and random string 1714, generated or received as discussed above. Memory 1716 stores machine-executable instructions 1722, including WiFi SoftAP Mode 1708, WiFi STATION Mode 1710, WiFi connection process 1704, provisioning process 1706, SSID generation process 1728, and passphrase generation process 1730.

In one or more examples, WiFi connection process 1704 includes operation 802, 806, 808 810, 812, 814, 816, and 818 of process 800. In one or more examples, provisioning process 1706 includes operation 820 of process 800.

Figure 18:
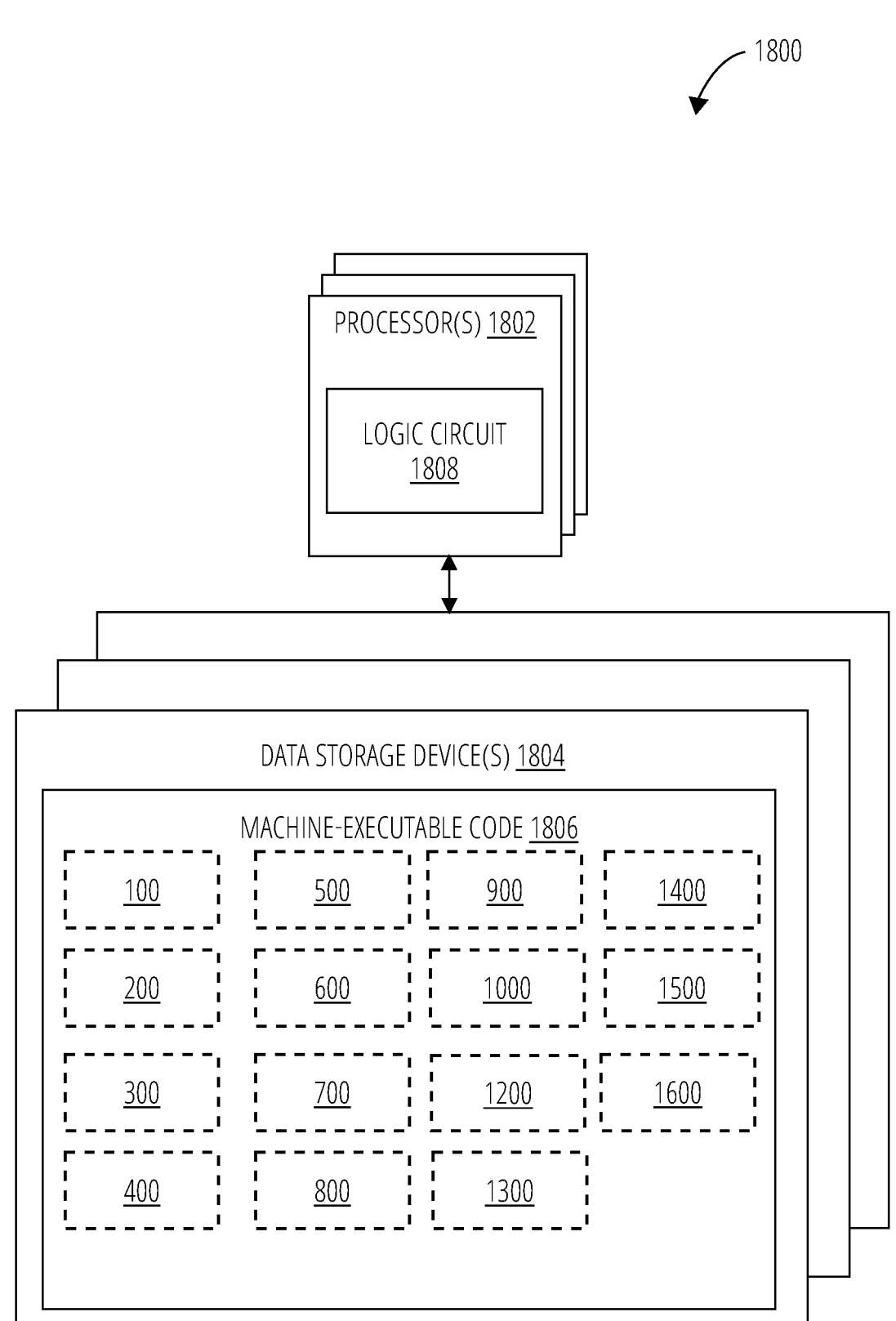
FIG. 18 is a block diagram of circuitry that, in some examples, may be used to implement various functions, operations, acts, processes, or methods disclosed herein.

FIG. 18 illustrates non-limiting examples of implementations of functional elements disclosed herein. In some examples, some or all portions of the functional elements disclosed herein may be performed by hardware specially adapted to, configured to, or capable of carrying out the functional elements.

FIG. 18 is a block diagram of a circuitry 1800 that, in some examples, may be used to implement various functions, operations, acts, processes, or methods disclosed herein. The circuitry 1800 includes one or more processors 1802 (sometimes referred to herein as "processors 1802") operably coupled to one or more data storage devices 1804 (sometimes referred to herein as "storage 1804"). The storage 1804 includes machine-executable code 1806 stored thereon and the processors 1802 include logic circuit 1808. The machine-executable code 1806 comprises information describing functional elements that may be implemented by (e.g., performed by) the logic circuit 1808. The logic circuit 1808 is adapted to implement (e.g., perform) the functional elements described by the machine-executable code 1806. The circuitry 1800, when executing the functional elements described by the machine-executable code 1806, should be considered as special purpose hardware for carrying out functional elements disclosed herein. In some examples the processors 1802 may perform the functional elements described by the machine-executable code 1806 sequentially, concurrently (e.g., on one or more different hardware platforms), or in one or more parallel process streams.

When implemented by logic circuit 1808 of the processors 1802, the machine-executable code 1806 may adapt the processors 1802 to perform operations of examples disclosed herein. By way of non-limiting example, the machine-executable code 1806 may adapt the processors 1802 to perform some or a totality of operations of one or more of: process 100, process 200, 300, process 400, process 500, process 600, process 700, process 800, process 900, process 1000, or process 1200.

Also by way of non-limiting example, the machine-executable code 1806 may adapt the processors 1802 to perform some or a totality of features, functions, or operations disclosed herein for one or more of: provisioner WiFi device 210, provisionee WiFi device 212, apparatus 1600, apparatus 1700, probe request frame element 1300, probe request frame element 1400, or content 1500. More specifically, features, functions, or operations disclosed herein for one or more of: provisioner WiFi device 1602, memory 1612, or processor 1618; provisionee WiFi device 1702, memory 1716 or processor 1724.

The processors 1802 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes functional elements corresponding to the machine-executable code 1806 (e.g., software code, firmware code, hardware descriptions) related to examples of the present disclosure. It is noted that a general-purpose processor (may also be referred to herein as a host processor or simply a host) may be a microprocessor, but in the alternative, the processors 1802 may include any conventional processor, controller, microcontroller, or state machine. The processors 1802 may also be implemented as a combination of computing devices, such as a combination of a DSP and a microprocessor, a plurality of microprocessors, one or more microprocessors in conjunction with a DSP core, or any other such configuration.

In some examples the storage 1804 includes volatile data storage (e.g., random-access memory (RAM)), non-volatile data storage (e.g., Flash memory, a hard disc drive, a solid state drive, erasable programmable read-only memory (EPROM), without limitation). In some examples the processors 1802 and the storage 1804 may be implemented into a single device (e.g., a semiconductor device product, a system on chip (SOC), without limitation). In some examples the processors 1802 and the storage 1804 may be implemented into separate devices.

In some examples the machine-executable code 1806 may include computer-readable instructions (e.g., software code, firmware code). By way of non-limiting example, the computer-readable instructions may be stored by the storage 1804, accessed directly by the processors 1802, and executed by the processors 1802 using at least the logic circuit 1808. Also by way of non-limiting example, the computer-readable instructions may be stored on the storage 1804, transferred to a memory device (not shown) for execution, and executed by the processors 1802 using at least the logic circuit 1808. Accordingly, in some examples the logic circuit 1808 includes electrically configurable logic circuit 1808.

In some examples the machine-executable code 1806 may describe hardware (e.g., circuitry) to be implemented in the logic circuit 1808 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG®, SYS-TEMVERILOG™ or very large scale integration (VLSI) hardware description language (VHDL) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuit 1808 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine-executable code 1806 may include an HDL, an RTL, a GL description, a mask level description, other hardware description, or any combination thereof.

In examples where the machine-executable code 1806 includes a hardware description (at any level of abstraction), a system (not shown, but including the storage 1804) may implement the hardware description described by the machine-executable code 1806. By way of non-limiting example, the processors 1802 may include a programmable logic device (e.g., an FPGA or a PLC) and the logic circuit 1808 may be electrically controlled to implement circuitry corresponding to the hardware description into the logic circuit 1808. Also by way of non-limiting example, the logic circuit 1808 may include hard-wired logic manufactured by a manufacturing system (not shown, but including the storage 1804) according to the hardware description of the machine-executable code 1806.

Regardless of whether the machine-executable code 1806 includes computer-readable instructions or a hardware description, the logic circuit 1808 is adapted to perform the functional elements described by the machine-executable code 1806 when implementing the functional elements of the machine-executable code 1806. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations that perform the actions of the module or component and/or software objects or software routines that may be stored on and/or executed by general purpose hardware (e.g., computer-readable media, processing devices, without limitation) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation). As used herein, the term "each" means "some or a totality." As used herein, the term "each and every" means a "totality."

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more," without limitation); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations, without limitation). Furthermore, in those instances where a convention analogous to "at least one of A, B, and C, without limitation" or "one or more of A, B, and C, without limitation" is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples include:

Example 1: A method, comprising changing a mode of a WiFi device from an idle mode to a software enabled access point (SoftAp) mode at least partially responsive to content of a custom data field of a WiFi frame; provisioning the WiFi device in SoftAp mode via a secure WiFi connection between the WiFi device and a further WiFi device; changing the mode of the provisioned WiFi device from the SoftAp mode to a station mode; and establishing a secure WiFi connection between the provisioned WiFi device in station mode and a WiFi access point.

Example 2: The method according to Example 1, wherein the WiFi frame is a probe request frame.

Example 3: The method according to any of Examples 1 and 2, wherein the custom data field is a content field of a vendor specific information element of the probe request frame.

Example 4: The method according to any of Examples 1 through 3, wherein the custom data field is an SSID field of a wildcard SSID element of the probe request frame.

Example 5: The method according to any of Examples 1 through 4, wherein the content of the custom data field is a random data.

Example 6: The method according to any of Examples 1 through 5, wherein the content of the custom data field is a command to be in SoftAp mode.

Example 7: A method, comprising: generating a random data; generating a passphrase; sending a probe request frame including content in a custom data field of the probe request frame, the content including the generated random data and a command to be in SoftAp mode; receiving a probe response frame or beacon frame from a provisionee WiFi device in SoftAp mode; sending a connection request to the provisionee WiFi device; establishing a secure WiFi connection with the provisionee WiFi device utilizing the generated passphrase; and sending provisioning data to the provisionee WiFi device via the secure WiFi connection, the provisioning data for connecting to a WiFi access point.

Example 8: The method according to Example 7, wherein the received probe response frame or beacon frame includes a session SSID in cypher text.

Example 9: The method according to any of Examples 7 and 8, comprising: authenticating the provisionee WiFi device.

Example 10: The method according to any of Examples 7 through 9, wherein authenticating the provisionee WiFi device comprises: determining whether or not a generated SSID matches a received SSID, the received SSID included with the probe response frame or beacon frame; if the generated SSID matches the received SSID then verifying identity of the provisionee WiFi device; and if the generated SSID does not match the received SSID then not verifying identity of the provisionee WiFi device.

Example 11: The method according to any of Examples 7 through 10, wherein sending the connection request to the provisionee WiFi device comprises: if the probe response frame or beacon frame included a received SSID and identity of the provisionee WiFi device was verified then set a session SSID to the received SSID; if the probe response frame or beacon frame did not include a received SSID and identity of the provisionee WiFi device was verified then set the session SSID to a generated SSID; and sending the connection request including the set session SSID.

Example 12: The method according to any of Examples 7 through 11, comprising: encrypt the set session SSID to cypher text utilizing a public cryptographic key.

Example 13: A method, comprising: receiving a probe request frame from a provisioner WiFi device, the probe request frame including content in a custom data field of the probe request frame, the content including random data and a command to be in Software Enabled Access Point (SoftAp) mode; authenticating the provisioner WiFi device; generating a passphrase at least partially based on the random data; changing, in response to the command to be in SoftAp mode, from an idle mode to a SoftAp mode; sending a probe response frame or a beacon frame to the provisioner WiFi device; receiving a connection request from the provisioner WiFi device; establishing a secure WiFi connection with the provisioner WiFi device utilizing the generated passphrase; receiving provisioning data from the provisioner WiFi device via the secure WiFi connection; and changing from SoftAp mode to station mode; and connecting to a WiFi access point utilizing the received provisioning data.

Example 14: The method according to Example 13, wherein authenticating the provisioner WiFi device comprises: decrypting the content to clear text utilizing a private cryptographic key; determining whether or not the content in clear text includes a command to be in SoftAp mode; if the content includes a command to be in SoftAp mode then verifying identity of the provisioner WiFi device; and if the content does not include a command to be in SoftAp mode then not verifying identity of the provisioner WiFi device.

Example 15: The method according to any of Examples 13 and 14, wherein changing from the idle mode to the SoftAp mode comprises: generating an SSID utilizing the random data; setting a session SSID to the generated SSID; and setting parameters for SoftAp mode to predetermined parameters associated with the command to be in SoftAp mode included with the content.

Example 16: The method according to any of Examples 13 through 15, wherein sending a probe response frame or a beacon frame to the provisioner WiFi device comprises: generating a session SSID utilizing the random data; and sending the probe response frame or beacon frame including the generated session SSID.

Example 17: The method according to any of Examples 13 through 16, wherein sending a probe response frame or a beacon frame to the provisioner WiFi device comprises: sending the probe response frame or beacon frame including a predetermined identifier in a custom data field of the probe request frame or beacon frame.

Example 18: An apparatus, comprising: at least one processor; and a memory to store machine-executable instructions that, when executed by the at least one processor, enable the at least one processor to: generate a random data and a passphrase; send a probe request frame including content in a custom data field of the probe request frame, the content including the generated random data and a command to be in SoftAp mode; receive a probe response frame or beacon frame from a provisionee WiFi device in SoftAp mode; authenticate the provisionee WiFi device; send a connection request to the provisionee WiFi device; establish a secure WiFi connection with the provisionee WiFi device utilizing the generated passphrase; and send provisioning data to the provisionee WiFi device via the secure WiFi connection, the provisioning data for connecting to a WiFi access point.

Example 19: An apparatus, comprising: at least one processor; and a memory to store machine-executable instructions that, when executed by the at least one processor, enable the at least one processor to: receive a probe request frame from a provisioner WiFi device, the probe request frame including content in a custom data field of the probe request frame, the content including random data and a command to be in Software Enabled Access Point (SoftAp) mode; generate a passphrase at least partially based on the random data; change, in response to the command to be in SoftAp mode, from an idle mode to a SoftAp mode; send a probe response frame or a beacon frame to the provisioner WiFi device; receive a connection request from the provisioner WiFi device; establish a secure WiFi connection with the provisioner WiFi device utilizing the generated passphrase; receive provisioning data from the provisioner WiFi device via the secure WiFi connection; and change from SoftAp mode to station mode; and connect to a WiFi access point utilizing the received provisioning data.

Example 20: A method, comprising: sending, from a provisioning WiFi device to a provisionee WiFi device in an idle mode, a probe request frame including a random string in a custom data field; changing a mode of the provisionee WiFi device from the idle mode to a SoftAp mode at least partially responsive to receiving the probe request frame; sending, from the provisioning WiFi device to the provisionee WiFi device in the SoftAp mode, a further probe request frame including the random string in a custom data field; sending, from the provisionee WiFi device in the SoftAp mode to the provisioning WiFi device, a probe response frame; establishing a secure WiFi connection between the provisioning WiFi device and the provisionee WiFi device utilizing passphrases respectively generated by the provisioning WiFi device and the provisionee WiFi device; and sending provisioning data, from the provisioning WiFi device to the provisionee WiFi device in SoftAp mode, via the secure WiFi connection.

Example 21: The method according to Example 20, comprising: changing the mode of the provisionee WiFi device to a station mode; and establishing a secure WiFi connection between the provisionee WiFi device and a WiFi router utilizing the provisioning data.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. A method, comprising:
changing a mode of a WiFi device from an idle mode to a software enabled access point (SoftAp) mode at least partially responsive to content of a custom data field of a WiFi frame;
provisioning the WiFi device in SoftAp mode via a secure WiFi connection between the WiFi device and a further WiFi device;
changing the mode of the provisioned WiFi device from the SoftAp mode to a station mode; and
establishing a secure WiFi connection between the provisioned WiFi device in station mode and a WiFi access point.

2. The method of claim 1, wherein the WiFi frame is a probe request frame.

3. The method of claim 2, wherein the custom data field is a content field of a vendor specific information element of the probe request frame.

4. The method of claim 2, wherein the custom data field is an SSID field of a wildcard SSID element of the probe request frame.

5. The method of claim 1, wherein the content of the custom data field is a random data.

6. The method of claim 1, wherein the content of the custom data field is a command to be in SoftAp mode.

7. A method, comprising:
generating a random data;
generating a passphrase;
sending a probe request frame including content in a custom data field of the probe request frame, the content including the generated random data and a command to be in SoftAp mode;
receiving a probe response frame or beacon frame from a provisionee WiFi device in SoftAp mode;
sending a connection request to the provisionee WiFi device;
establishing a secure WiFi connection with the provisionee WiFi device utilizing the generated passphrase; and
sending provisioning data to the provisionee WiFi device via the secure WiFi connection, the provisioning data for connecting to a WiFi access point.

8. The method of claim 7, wherein the received probe response frame or beacon frame includes a session SSID in cypher text.

9. The method of claim 7, comprising:

authenticating the provisionee WiFi device.

10. The method of claim 9, wherein authenticating the provisionee WiFi device comprises:

determining whether or not a generated SSID matches a received SSID, the received SSID included with the probe response frame or beacon frame;

if the generated SSID matches the received SSID then verifying identity of the provisionee WiFi device; and if the generated SSID does not match the received SSID then not verifying identity of the provisionee WiFi device.

11. The method of claim 7, wherein sending the connection request to the provisionee WiFi device comprises:

if the probe response frame or beacon frame included a received SSID and identity of the provisionee WiFi device was verified then set a session SSID to the received SSID;

if the probe response frame or beacon frame did not include a received SSID and identity of the provisionee WiFi device was verified then set the session SSID to a generated SSID; and sending the connection request including the set session SSID.

12. The method of claim 11, comprising:

encrypt the set session SSID to cypher text utilizing a public cryptographic key.

13. A method, comprising:

receiving a probe request frame from a provisioner WiFi device, the probe request frame including content in a custom data field of the probe request frame, the content including random data and a command to be in Software Enabled Access Point (SoftAp) mode;

authenticating the provisioner WiFi device;

generating a passphrase at least partially based on the random data;

changing, in response to the command to be in SoftAp mode, from an idle mode to a SoftAp mode;

sending a probe response frame or a beacon frame to the provisioner WiFi device;

receiving a connection request from the provisioner WiFi device;

establishing a secure WiFi connection with the provisioner WiFi device utilizing the generated passphrase;

receiving provisioning data from the provisioner WiFi device via the secure WiFi connection; and changing from SoftAp mode to station mode; and connecting to a WiFi access point utilizing the received provisioning data.

14. The method of claim 13, wherein authenticating the provisioner WiFi device comprises:

decrypting the content to clear text utilizing a private cryptographic key;

determining whether or not the content in clear text includes a command to be in SoftAp mode;

if the content includes a command to be in SoftAp mode then verifying identity of the provisioner WiFi device; and if the content does not include a command to be in SoftAp mode then not verifying identity of the provisioner WiFi device.

15. The method of claim 13, wherein changing from the idle mode to the SoftAp mode comprises:

generating an SSID utilizing the random data;

setting a session SSID to the generated SSID; and setting parameters for SoftAp mode to predetermined parameters associated with the command to be in SoftAp mode included with the content.

16. The method of claim 13, wherein sending a probe response frame or a beacon frame to the provisioner WiFi device comprises:

generating a session SSID utilizing the random data; and sending the probe response frame or beacon frame including the generated session SSID.

17. The method of claim 13, wherein sending a probe response frame or a beacon frame to the provisioner WiFi device comprises:

sending the probe response frame or beacon frame including a predetermined identifier in a custom data field of the probe request frame or beacon frame.

18. An apparatus, comprising:

at least one processor; and a memory to store machine-executable instructions that, when executed by the at least one processor, enable the at least one processor to:

generate a random data and a passphrase;

send a probe request frame including content in a custom data field of the probe request frame, the content including the generated random data and a command to be in SoftAp mode;

receive a probe response frame or beacon frame from a provisionee WiFi device in SoftAp mode;

authenticate the provisionee WiFi device;

send a connection request to the provisionee WiFi device;

establish a secure WiFi connection with the provisionee WiFi device utilizing the generated passphrase; and send provisioning data to the provisionee WiFi device via the secure WiFi connection, the provisioning data for connecting to a WiFi access point.

19. An apparatus, comprising:

at least one processor; and a memory to store machine-executable instructions that, when executed by the at least one processor, enable the at least one processor to:

receive a probe request frame from a provisioner WiFi device, the probe request frame including content in a custom data field of the probe request frame, the content including random data and a command to be in Software Enabled Access Point (SoftAp) mode;

generate a passphrase at least partially based on the random data;

change, in response to the command to be in SoftAp mode, from an idle mode to a SoftAp mode;

send a probe response frame or a beacon frame to the provisioner WiFi device;

receive a connection request from the provisioner WiFi device;

establish a secure WiFi connection with the provisioner WiFi device utilizing the generated passphrase;

receive provisioning data from the provisioner WiFi device via the secure WiFi connection; and change from SoftAp mode to station mode; and connect to a WiFi access point utilizing the received provisioning data.

20. A method, comprising:

sending, from a provisioning WiFi device to a provisionee WiFi device in an idle mode, a probe request frame including a random string in a custom data field;

changing a mode of the provisionee WiFi device from the idle mode to a SoftAp mode at least partially responsive to receiving the probe request frame;

sending, from the provisioning WiFi device to the provisionee WiFi device in the SoftAp mode, a further probe request frame including the random string in a custom data field;

sending, from the provisionee WiFi device in the SoftAp mode to the provisioning WiFi device, a probe response frame;

establishing a secure WiFi connection between the provisioning WiFi device and the provisionee WiFi device utilizing passphrases respectively generated by the provisioning WiFi device and the provisionee WiFi device; and sending provisioning data, from the provisioning WiFi device to the provisionee WiFi device in SoftAp mode, via the secure WiFi connection.

21. The method of claim 20, comprising:

changing the mode of the provisionee WiFi device to a station mode; and establishing a secure WiFi connection between the provisionee WiFi device and a WiFi router utilizing the provisioning data.

* * * * *